March 7, 1967 R. M. HAYES ETAL 3,307,463
CARD PROCESSING APPARATUS
Original Filed Jan. 12, 1959 12 Sheets-Sheet 1

INVENTORS
Robert M. Hayes
Alfred M. Nelson

By Smyth, Roston & Pavitt
Attorneys

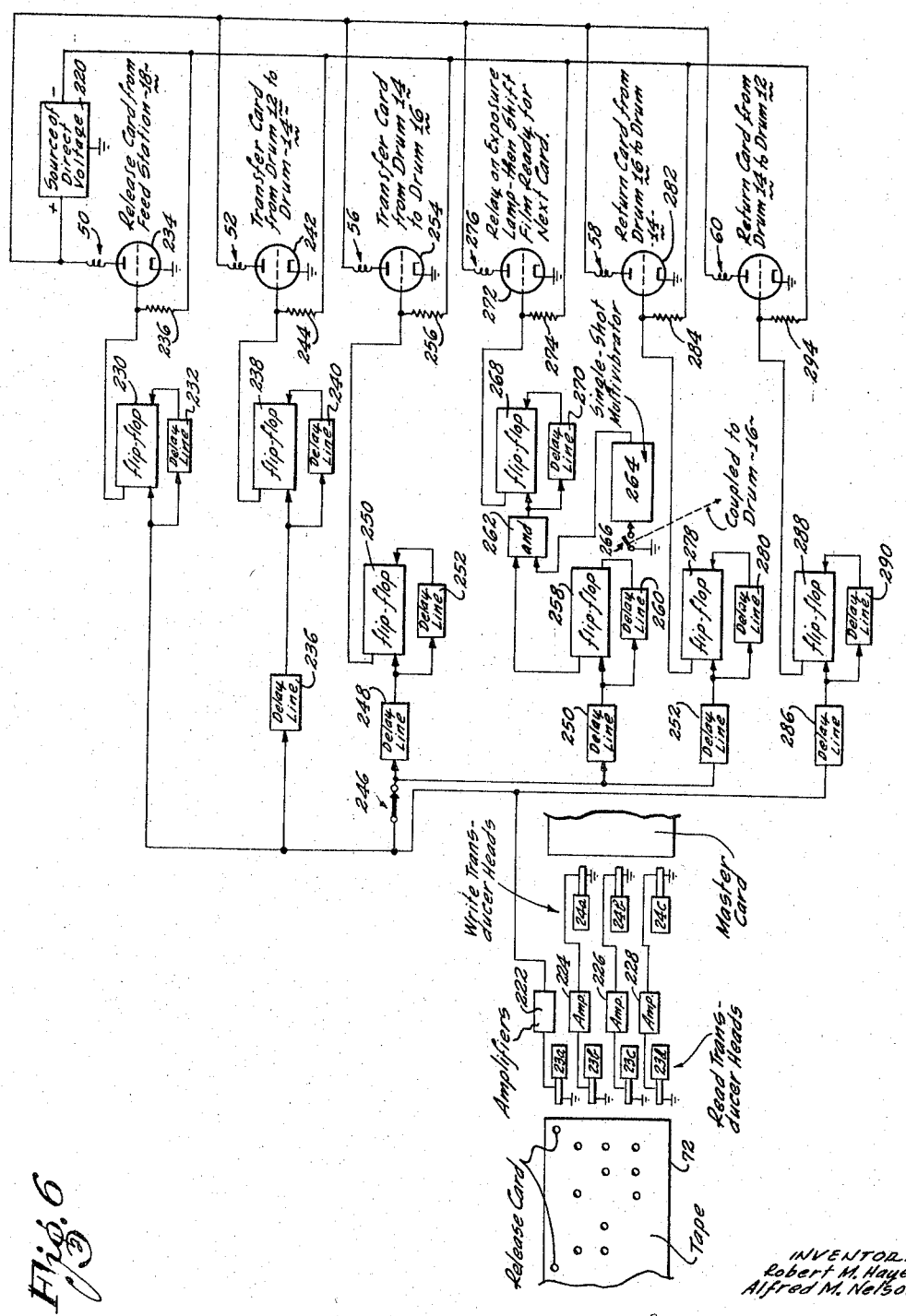

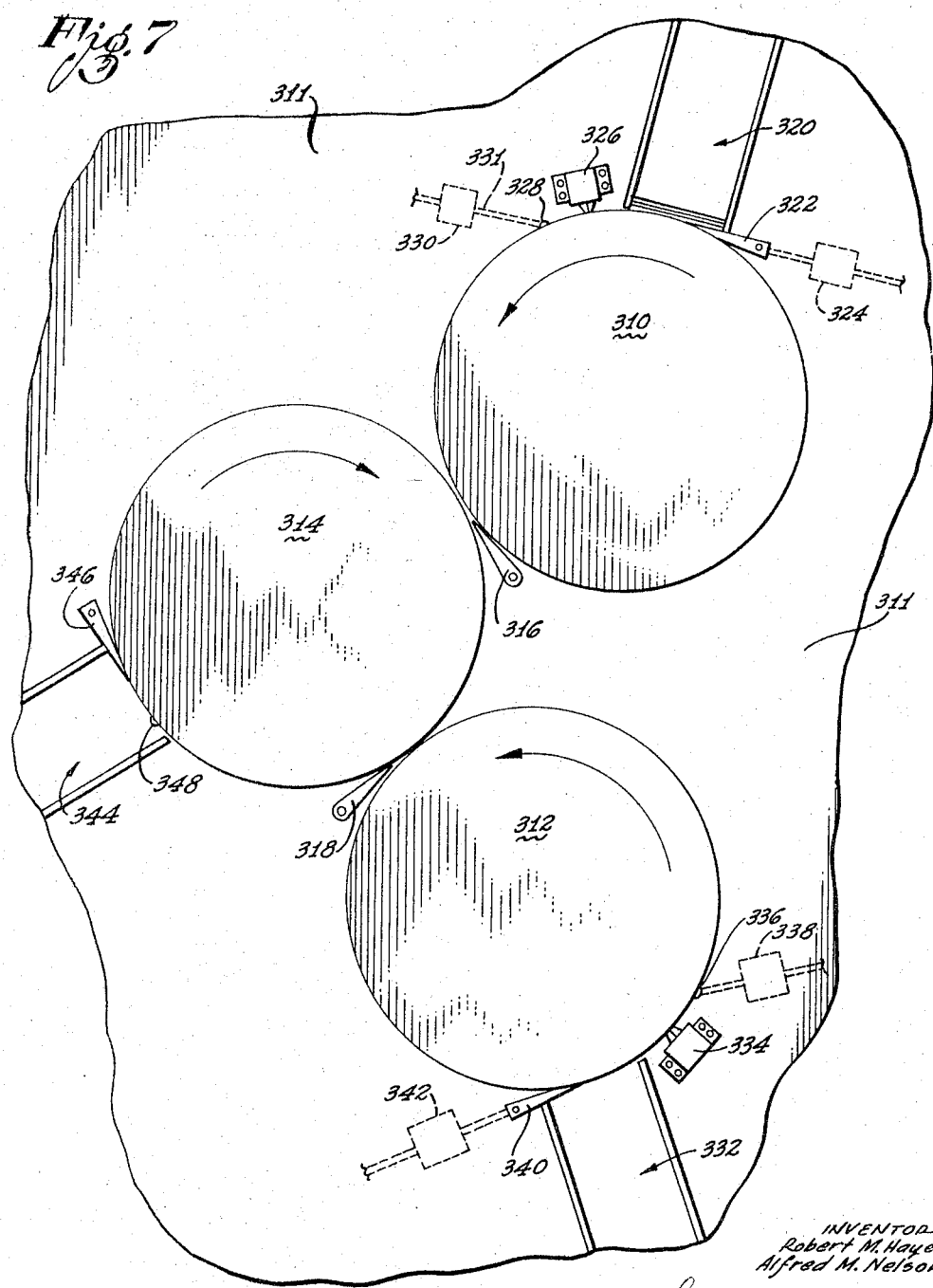

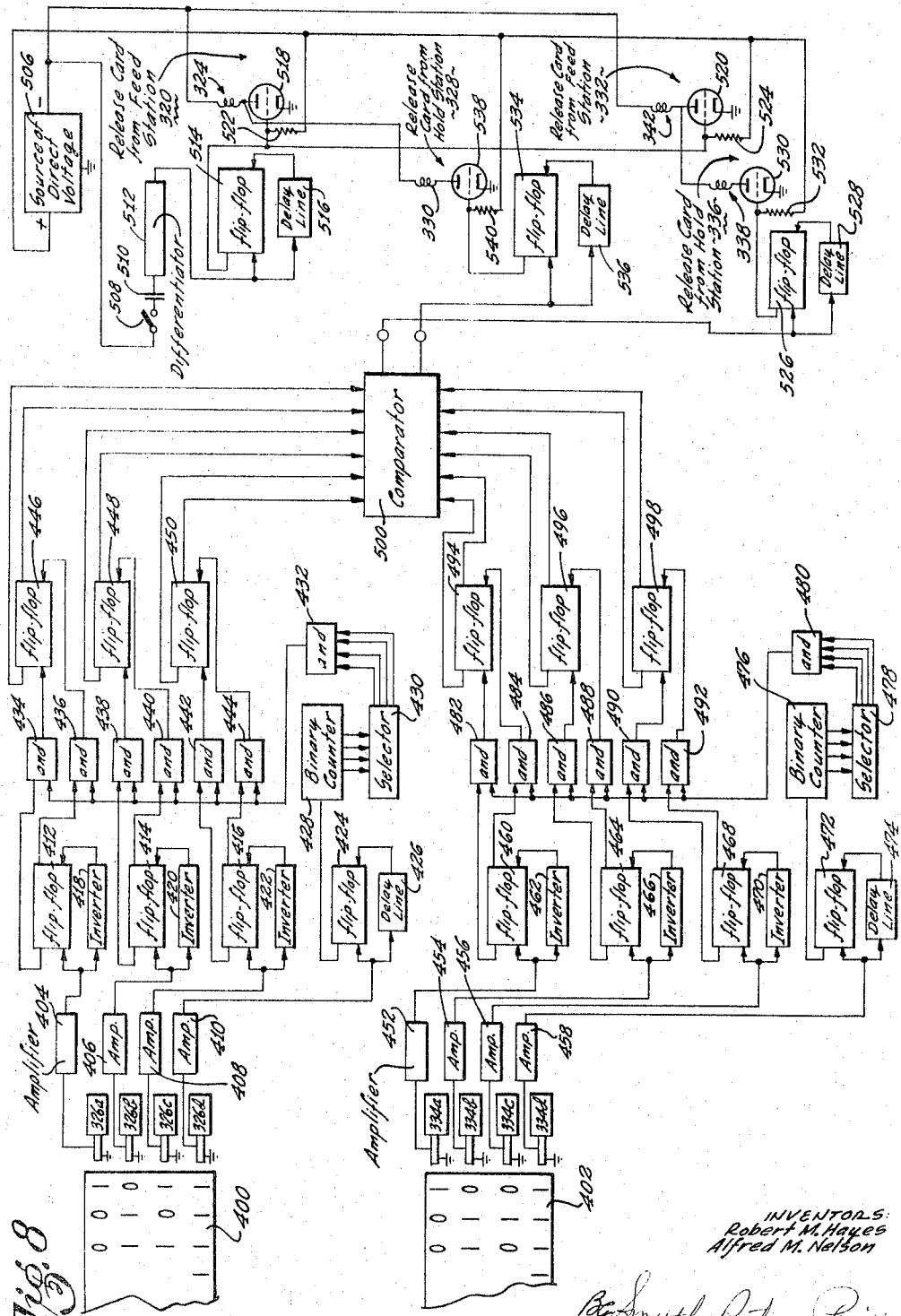

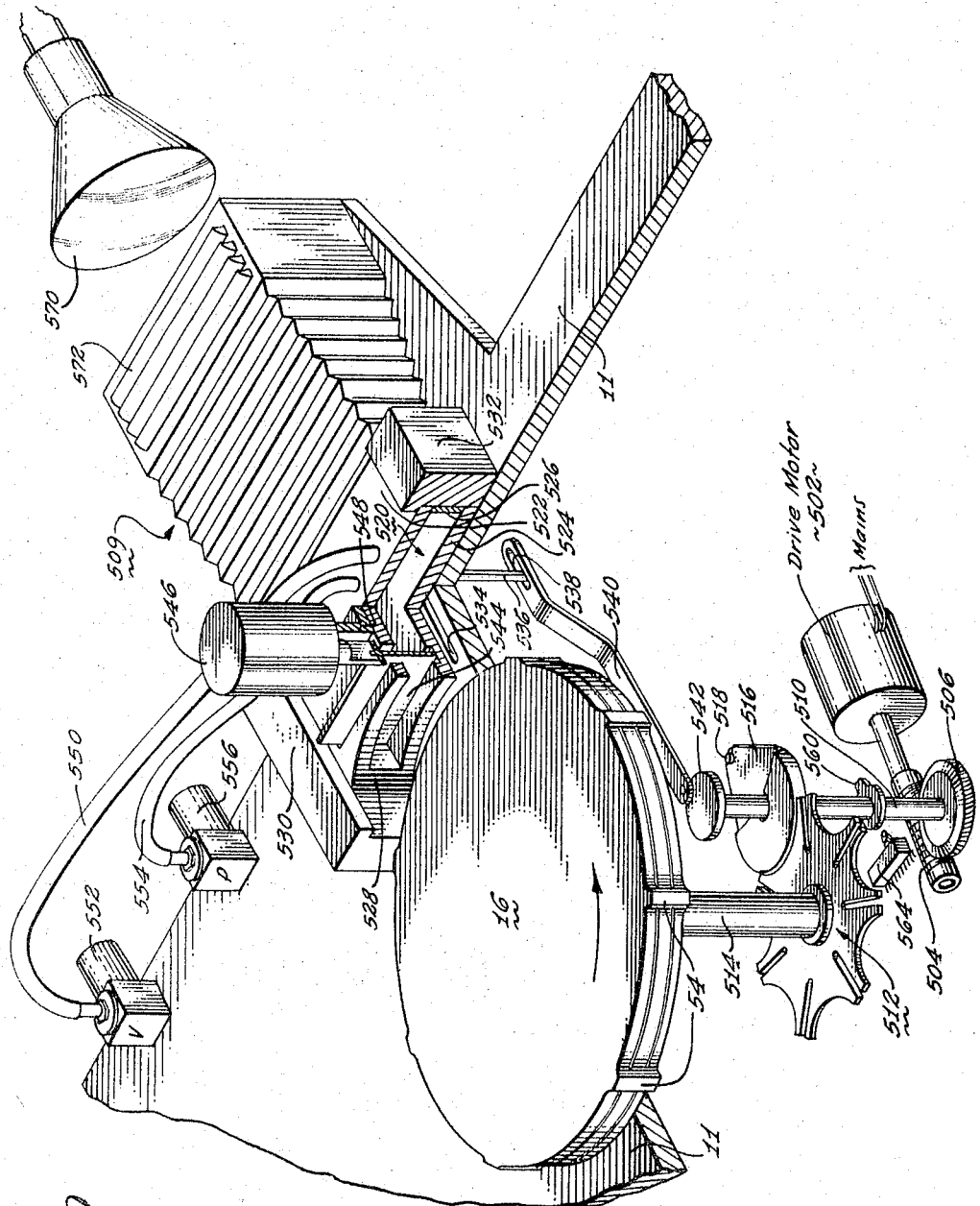

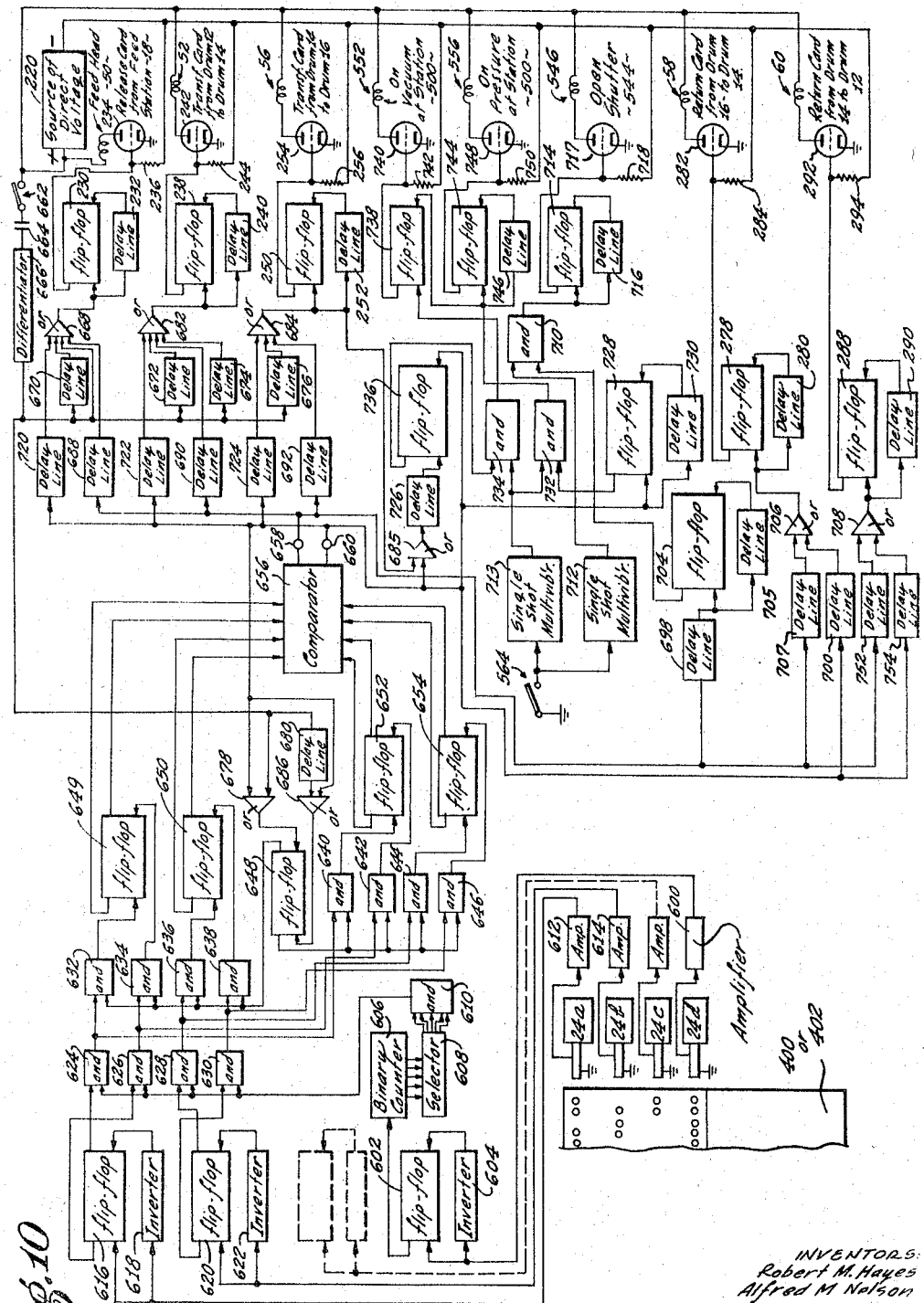

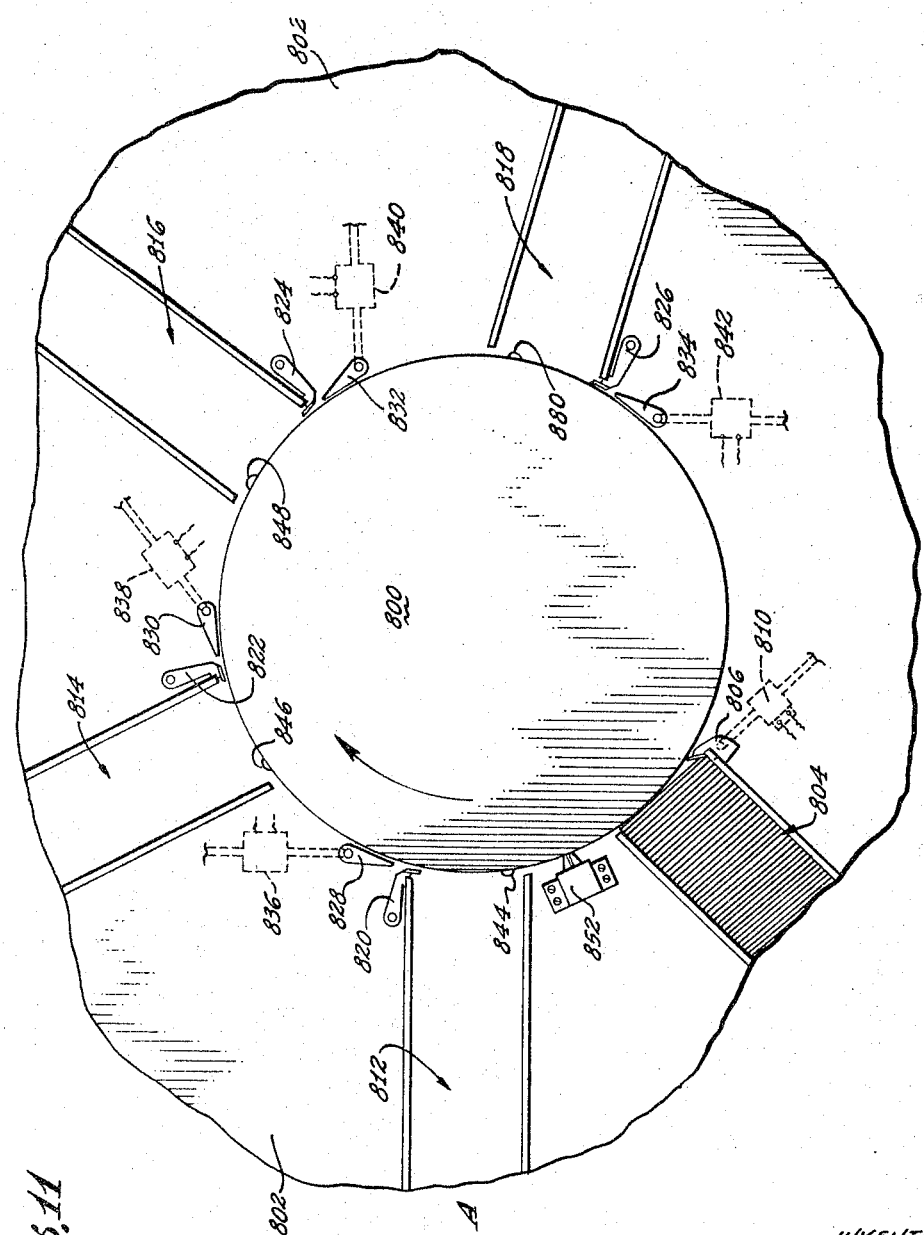

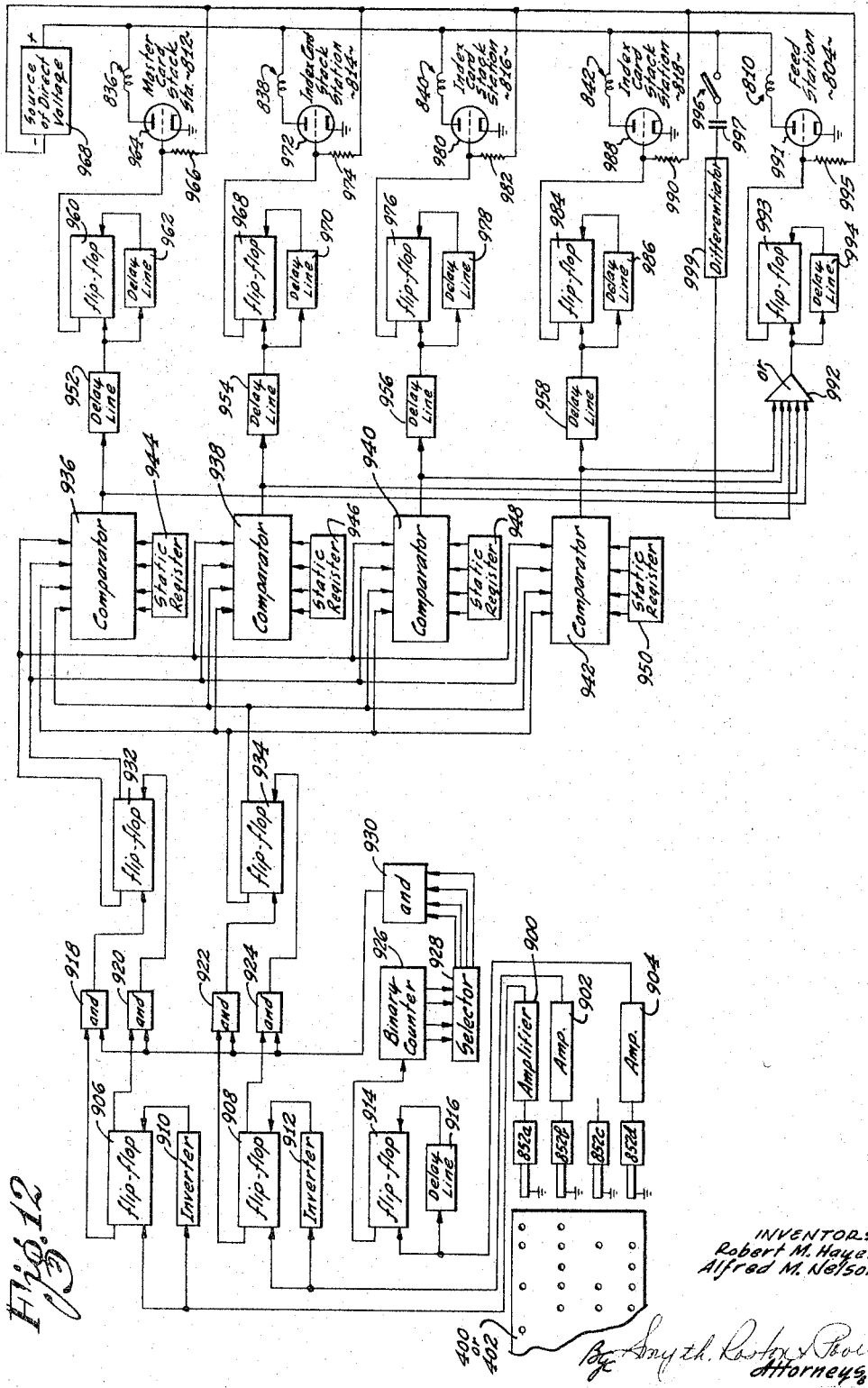

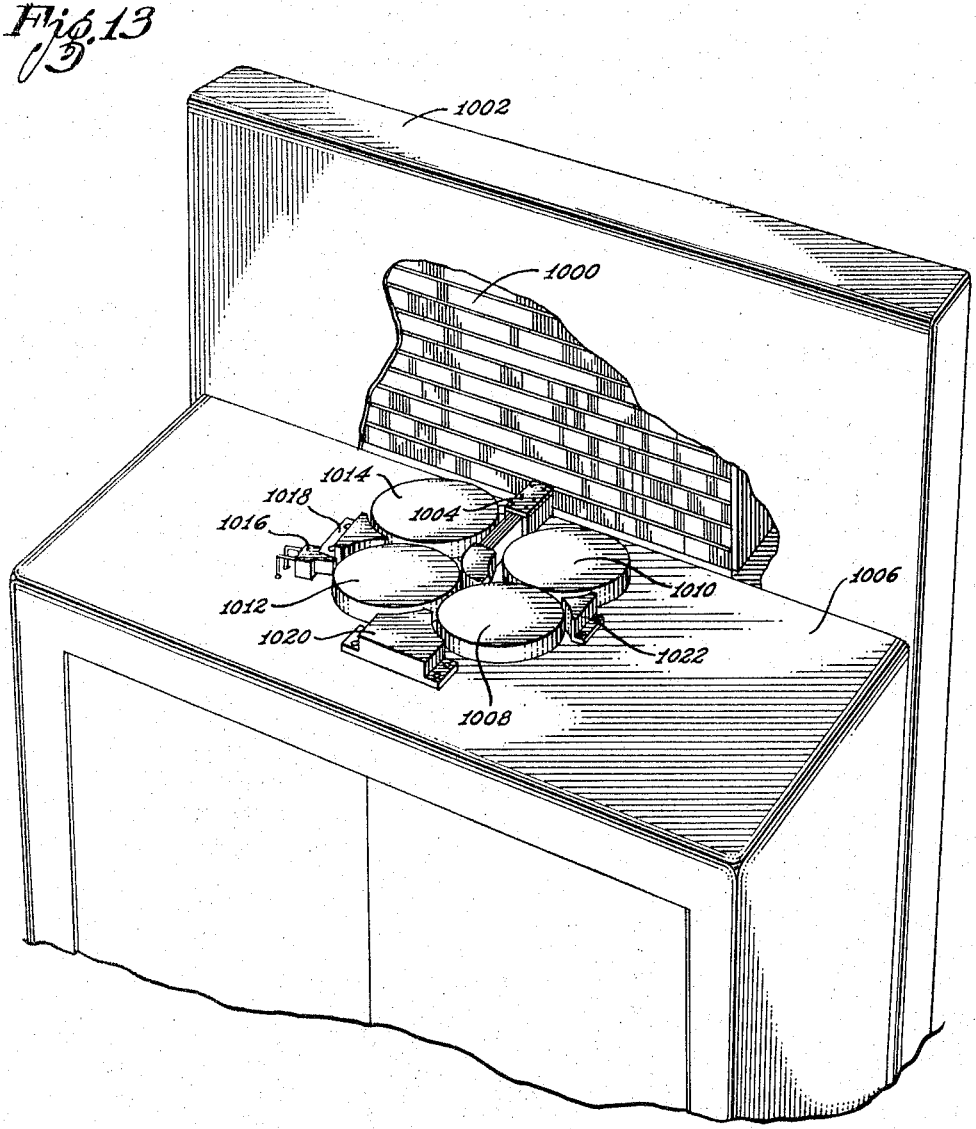

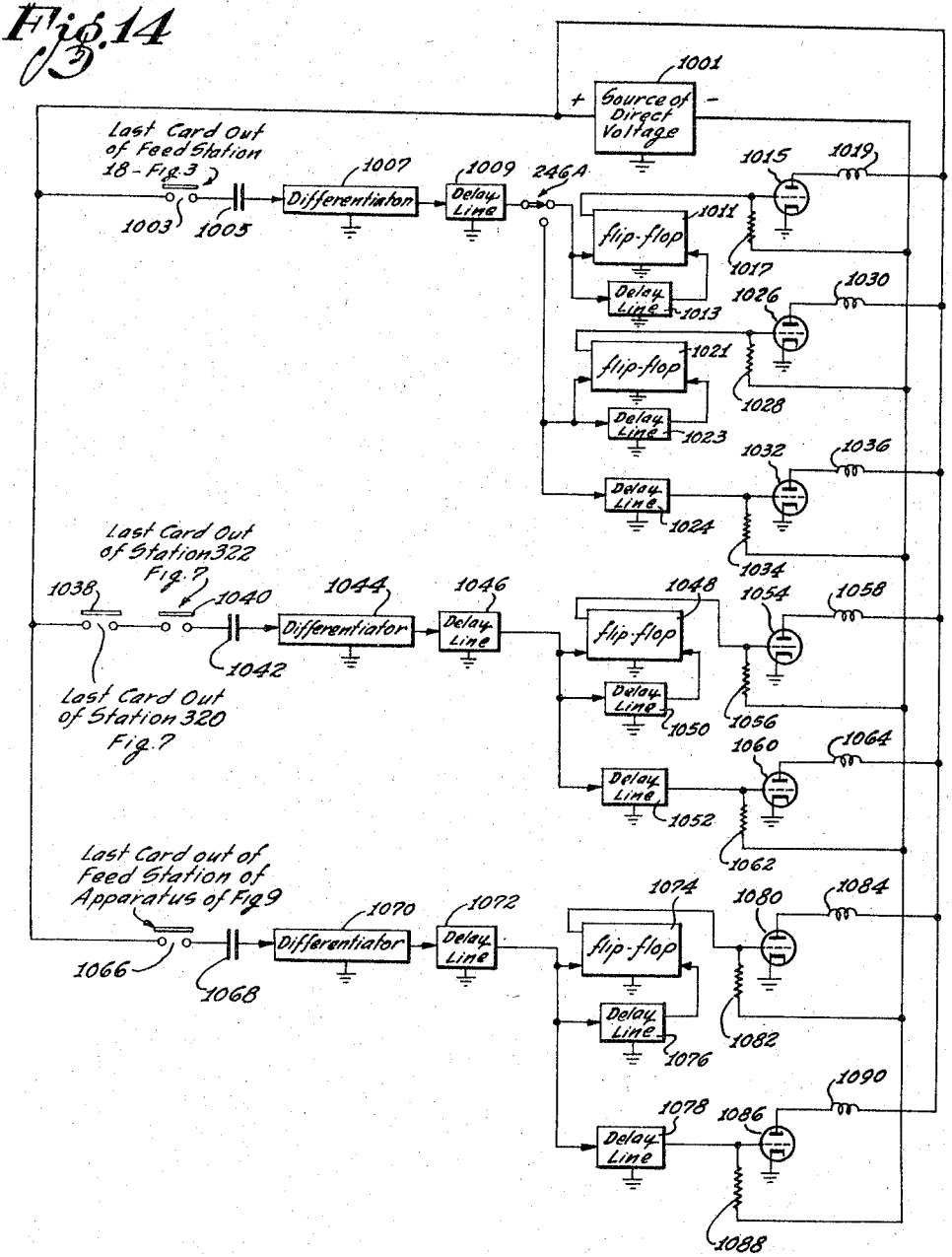

United States Patent Office 3,307,463
Patented Mar. 7, 1967

3,307,463
CARD PROCESSING APPARATUS
Robert M. Hayes, Sherman Oaks, and Alfred M. Nelson, Redondo Beach, Calif., assignors, by mesne assignments, to The Magnavox Company, Torrance, Calif., a corporation of Delaware
Original application Jan. 12, 1959, Ser. No. 786,214. Divided and this application Sept. 14, 1962, Ser. No. 224,285
3 Claims. (Cl. 95—73)

The present invention relates to document storage systems, and it relates more particularly to systems and apparatus for photographically recording documentary data on each of a plurality of individual cards and for recording identifying information on the cards which pertains to the documentary data and is a division of our copending application Serial No. 786,214, filed January 12, 1959, now Patent No. 3,100,431. The invention also relates to apparatus and systems for sensing the identifying information on the various cards to make cards carrying required documentary data readily available or to add cards bearing new documentary data into the proper locations in the over-all file.

In general, the system and apparatus of the invention is intended to provide for the storage of large quantities of documentary data and, at the same time, to provide for the automatic and rapid access to any desired portion of the data file.

Card processing systems and apparatus are known in which data is stored on a plurality of individual cards. The data is so stored either in the form of punchings conforming to a coded pattern, in the form of groupings of magnetic dots of north or south polarity selected in accordance with a predetermined code, or in a variety of other ways.

The information storage cards referred to in the preceding paragraph are stored in the card processing apparatus in a stacked condition in one or more card holding stations. Equipment has been devised which is capable of receiving the cards in succession from the card holding stations, and which includes transport means for carrying the cards in a progression past suitable transducers. These transducers serve to convert the data on the various cards into electrical signals.

The transducers process the recorded data on the cards to initiate appropriate controls. These controls enable the cards to be sorted, collated, or otherwise dealt with at a high speed. Also, the transducers may be controlled to read data from the cards or to write new data on the cards.

The present invention will be described in conjunction with the magnetic recording type of cards, and in conjunction with apparatus for handling such cards which utilized one or more rotatable vacuum pressure transport drums for carrying the cards from one station to another. It will be clear, however, as the description proceeds that the invention can be used with many different types of card recording techniques and card transport systems.

The need for large volume document storage with fast, mechanized selective access to the stored documents, has been rapidly increasing in recent years. The development of microfilm techniques has been a big step in overcoming the problems of handling and storing copies of individual documents. However, this type of storage is inherently on a continuous storage basis, and it is virtually impossible with microfilm techniques to organize files having a feasible accessibility to the individual items in the files. It is also impossible for all practical purposes to accommodate for the growth of individual portions of the stored documentary data in a microfilm type of system.

The limitations of microfilm processes, such as those pointed out above, have led in recent years to the development of unit document storage means in which document copies are stored on individual cards or the like. However, prior art systems and apparatus using such cards in accordance with prior art practice do not fully answer the basic problems of rapid mechanized access to any desired group of the stored documentary copies.

An important object of the present invention is to provide an improved document storage system which is capable of providing document storage on an individual card basis, and which system exhibits an ability to select rapidly any desired card or group of cards.

The improved document storage apparatus and system of the invention is also advantageous in that it may be constructed to provide for the handling of expansions in any portion of the documentary data stored in the system, the arrangement being such that new cards representing such expansion can be quickly and conveniently collated to the proper location in the system. Also, the improved documentary storage apparatus and system of the embodiment of the invention to be described exhibits an ability to conveniently update and modify the identifying data on any of the cards used in the system.

In the embodiment of the invention to be described, the documentary data is recorded photographically in reduced size on each of a plurality of separate cards. For example, each card may bear photographic impressions of several documentary pages. In addition, the identifying information for each card is recorded on the card in the form of magnetic dots of one polarity or the other. However, the identifying information can be recorded in any other form such as punched holes or opaque dots responsive to photoelectric techniques.

By the use of cards such as those described above, and by the provision of apparatus for handling such cards, many significant advantages can be gained. For example, files can be easily organized for maximum efficiency with respect to access of individual documentary items. Also, as noted above, new items can be easily collated into their proper location in the file and other items can easily be removed for transfer to other files.

A further advantage of the embodiment of the invention to be described is the fact that the magnetic coded identifying data on the various cards can easily be changed for revision and updating purposes. Moreover, the handling speeds of the apparatus to be described in transporting the cards for collating, sorting and selection are of the order of hundreds of cards per second. In addition, the equipment which will be described is extremely reliable in its operation.

The photographic storage of the document images on the cards can be conveniently carried out by use of recent techniques that have been developed in photographic processes. For example, diazo emulsions offer a completely automatic self-contained exposure and development of the emulsions. This means that a separate chemical developing process for the photographic images on the cards is unnecessary.

The concepts and further features and advantages of the present invention will be better understood by a consideration of the following description and of the accompanying drawings in which:

FIGURE 6 is a circuit diagram of a logic control system for providing the required controls for the apparatus of FIGURE 3;

FIGURE 7 is a top plan view of suitable apparatus for collating the master cards produced by the apparatus of FIGURE 2 with associated index cards, the collating apparatus providing a stack of cards in which each master card is followed by all the index cards pertaining to the particular master card;

FIGURE 8 is a circuit diagram of the logic control system required to accomplish the desired purpose of the apparatus of FIGURE 7;

FIGURE 9 is a perspective view in somewhat schematic form of suitable apparatus for use in conjunction with the apparatus of FIGURE 3 to effect a photographic transfer from the microfilm to the master cards, and also to effect photographic transfers from each master card to its associated index cards;

FIGURE 10 is a circuit diagram of a suitable logic control system for controlling the apparatus of FIGURE 3 to enable that apparatus automatically to transfer photographic data from each master card to its associated index cards;

FIGURE 11 is a top plan view of suitable apparatus for automatically separating the index cards from the master cards, and for separating the index cards into various subject matter groups;

FIGURE 12 is a logic diagram of a suitable control system for the apparatus of FIGURE 10;

FIGURE 13 is a perspective view of suitable apparatus in which the cards of the present invention may be stored and which enables a desired card to be selected; and FIGURE 14 is a representation of logic circuitry capable of automatically controlling the equipment of the invention.

Figure 1:
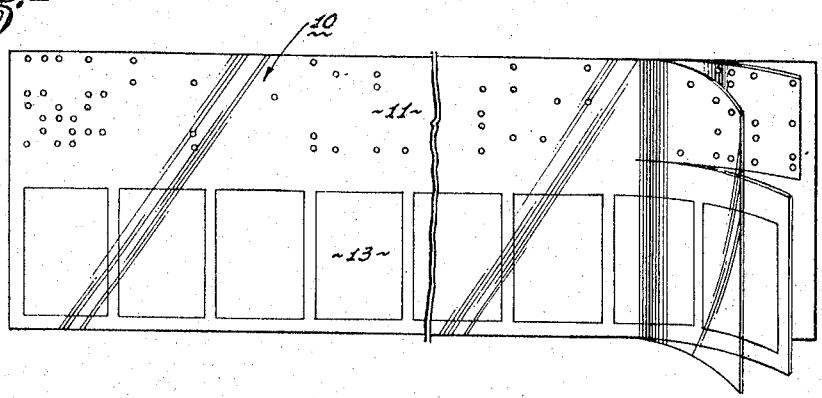
FIGURE 1 shows an information storage card fabricated in accordance with the invention, the card being shown on a somewhat enlarged scale to illustrate clearly the manner in which magnetic data is recorded on a portion of the card and photographic images are placed on another portion.

The information storage card illustrated in FIGURE 1 is designed to carry a set of document images, as well as coded magnetic identifying data. The card dimensions may, for example, be 1" x 3" x .005". The card may have a base formed of a plastic material such as the material presently marketed by the E. I. du Pont de Nemours Company and designated by that company as "Mylar." A layer of magnetizable oxide is formed on the portion of the base which constitutes the magnetic area. This area may extend the length of the card and have a width, for example, of ⅜th of an inch. This magnetizable oxide layer is of the type having a high retentivity so that localized areas of the layer can be permanently magnetized with a north polarity or with a south polarity in accordance with a designated code.

A layer of photographic emulsion is also formed on the base to provide the photographic storage area for the documentary images. This latter layer may also extend, for example, the length of the card and it may have a width of ⅝th inch. A thin protective layer of "Mylar" may then be formed over the magnetic and photographic storage areas.

The magnetic storage area 11 on each card may, for example, have a storage capacity of 256 characters of data. The data may, for example, be formed in eight parallel rows, with 256 binary bits in each row. The organization may then be such that 256 columns of binary data are formed on each card, with each column representing a multi-digit binary number. This binary number, in turn, may represent a decimal number equivalent or a letter or word, depending on the type of coding used. The magnetic data may then be organized into fields, with each field being devoted to a different type of significant information. In each instance, of course, the magnetic data serves to index and identify the documentary images on the particular card. The purpose of the magnetic data is to permit the card to be automatically processed so that the card or cards representing a desired group of documents may be quickly selected from the entire file, whenever such cards are desired, and later reentered in the file.

The photographic storage area 13 of each of the information storage cards may have, for example, a capacity for receiving the photographic images of seven document pages. Each page may have a normal dimension of 8½" x 14", for example, and the photographic reduction ratio may conveniently be of the order of 25:1.

When a document is received which is to be incorporated into the storage system of the invention, the document is first microfilmed in accordance with usual microfilming techniques. The microfilming may, for example, be on 16 mm. film, and the usual "page frame" symbols and "end of document" symbols may be used.

Then, by a standard key punching operation, based on a reading of the microfilm, a punched tape record is produced. This record will include the document number and page count. As noted above, in a particular example it is proposed that each information card will have a capacity to receive the photographic images of seven document pages. Therefore, a punched tape record will include a punching at the end of each interval corresponding to seven document pages, and this punching will be used in a manner to be described to control the release of a new master card whose composition will also be described. Also, for any document having more than seven pages, the identifying data on the punched tape will be arranged so that a plurality of master cards may be properly identified as carrying documentary images of several pages all pertaining to a single document.

Figure 2:
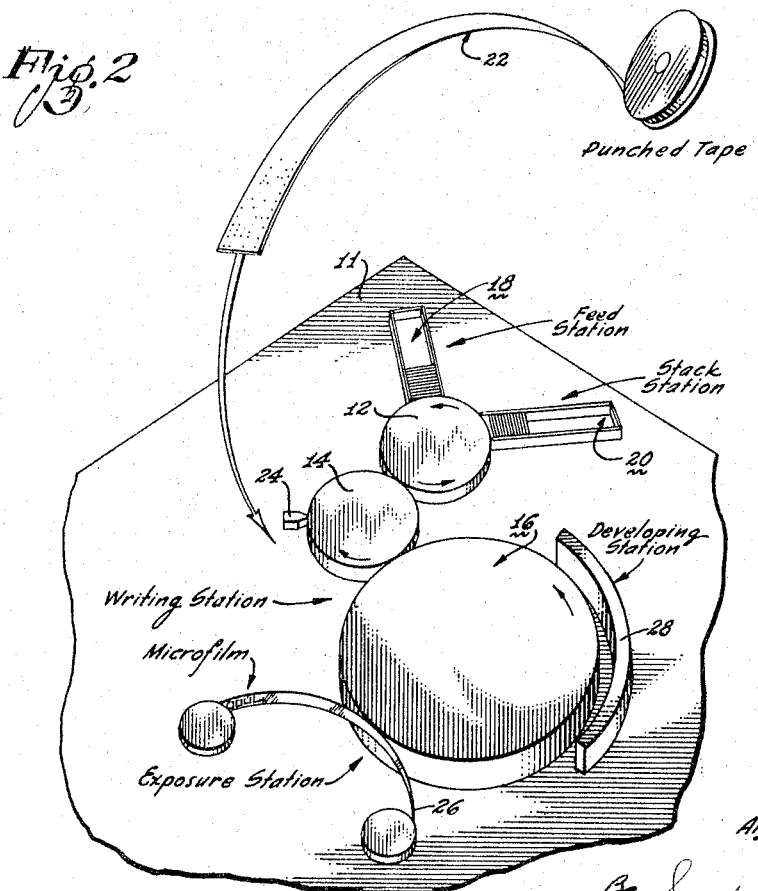
FIGURE 2 is a schematic representation of suitable apparatus for producing master cards in accordance with the present invention from data derived from a punched tape and from a microfilm.

The microfilm and the punched tape are then acted on by the apparatus shown in FIGURE 2 to provide one or more master cards for each document, as determined by the number of documentary pages.

The apparatus of FIGURE 2 includes a table top 11, and three rotatable vacuum pressure drums 12, 14 and 16 are mounted on the table top. The drums 12 and 14 are mounted contiguous to one another, as are the drums 14 and 16. The drums 12 and 16 may be rotated in a counter-clockwise direction, and the drum 14 may be rotated in a clockwise direction. The constructional details of these drums will be described subsequently. Each drum is controlled so that it produces a vacuum pressure at its peripheral surface, and this vacuum pressure serves to firmly retain the information cards on that surface to enable such cards to be transported from one station to another. The drums 12 and 14 rotate at an equal and relatively high speed, whereas the drum 16 rotates intermittently at a relatively low speed.

A quantity of cards such as the card described in conjunction with FIGURE 1 are stored in an upright, stacked condition in a feed type of card holding station 18. The feed station 18 is mounted on the table top 11 and is disposed with its mouth adjacent the peripheral surface of the drum 12. The cards are controllably fed from the feed station 18 to the periphery of the drum 12. Each such card that is fed to the drum 12 is carried by it and subsequently transferred to the drum 14. The card is then transferred to the drum 16, to be later returned to the drum 14 and then returned to the drum 12. The card is finally stacked in a stack type of card holding station 20 in a generally upright stacked condition. The stack station 20 is also mounted on the table top 11 with its mouth adjacent the periphery of the drum 12.

The punched tape which contains the identifying information for the different master cards is indicated schematically as 22. This type is fed through a tape reader of any known construction, and the data corresponding to the various punchings on the tape is converted by the reader to electrical signals. These signals are introduced to a transducer 24. The transducer is mounted on the table top 11, and it incorporates a plurality of electromagnetic writing-reading transducer heads. The transducer may have any appropriate known construction. For example, it may be constructed in the manner described in copending application 505,248, filed May 2, 1955, in the name of Alfred Nelson et al., or in copending application 688,202, filed October 4, 1957, in the name of Eric Azari et al. The transducer is positioned on the table top 11 adjacent the periphery of the drum 14.

When the signals from the tape 22 are fed to the transducer 24, this transducer causes the magnetic storage area of the transported cards such as the card 10 to be magnetized with dots of north or south polarity in accordance with the data to be recorded, and the magnetized data on the different cards corresponds to the data punched in the tape 22. Therefore, as each master card is carried by the drum 14 past the transducer 24, identifying information on the tape 22 corresponding to that master card is transferred to the magnetic area of the card. The card is then transferred to the drum 16 so that the corresponding photographic images may be recorded on it.

As each master card receives its identifying information from the punched tape 22 and by the transducer 24, the card is transferred to the drum 16. It is carried by the later drum past an exposure station 26 at which the images from the microfilm are exposed onto the photographic emulsion on the particular card.

As noted above, the drum 16 is moved in an intermittent manner in synchronism with the drive of the drum 16. Seven frames of the microfilm corresponding, for example, to the storage capacity of each card, are simultaneously exposed onto the photographic area of the card during a dwell interval in the intermittent drive of the drum 16 and of the microfilm. The card is then carried by the drum 16 to a developing station which is represented schematically as 28. As noted above, when a particular type of photographic technique is used, using diazo emulsions, for example, the exposure and developing can be combined in a single station. Suitable apparatus for effecting this will be described subsequently in conjunction with FIGURE 9.

The master card in the particular apparatus being discussed now contains a set of seven photographic images corresponding respectively to seven different documentary pages, and it also includes magnetic information which identifies the document. This card is then returned to the drum 14, and it is subsequently returned to the drum 12 to be stacked in the stack station 20. In this manner, a plurality of master cards are provided in the stack station, with each master card bearing a set of photographic documents images and carrying magnetic information identifying the document.

Figure 3:
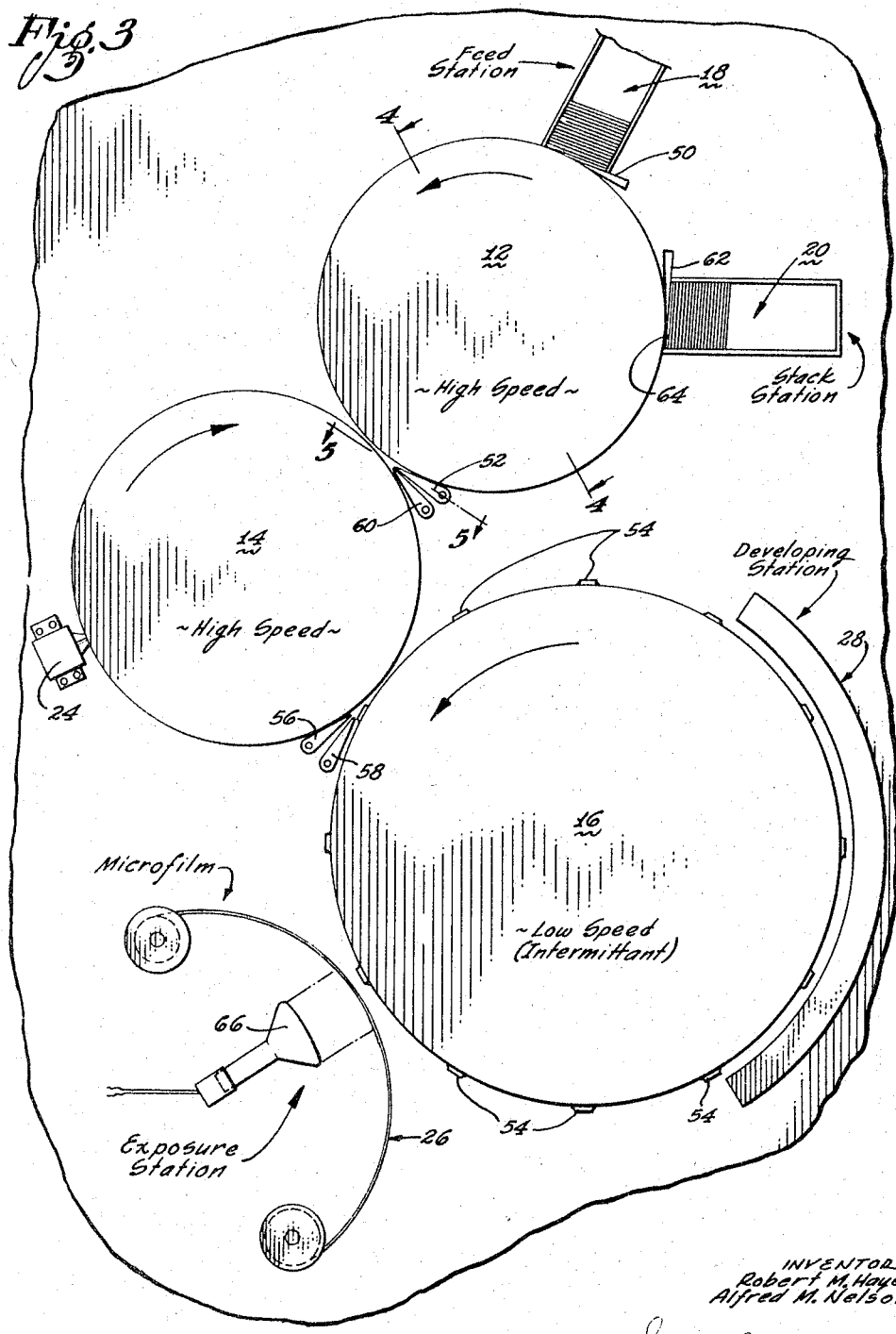
FIGURE 3 is a top plan view of the apparatus of FIGURE 2, this latter view showing in greater detail the various components which make up the apparatus for forming master cards in accordance with the invention.

As noted above, the aparatus of FIGURE 2 is shown in somewhat more detail in FIGURE 3. As shown in FIGURE 2, the feed station 18 has a feed head 50 associated with it. This head may be constructed in the manner described and claimed in copending application 552,506 which was filed December 12, 1955, in the name of Hans M. Stearn. This feed head extends through the leading wall of the station 18 (with respect to the rotation of the drum 16), and it projects partially across the mouth of the station. A vacuum pressure is established at the face of the feed head, and the cards in the station are biased toward the mouth of the station and against the face of the feed head to be retained in the station by the vacuum pressure established at that face. The leading portion of the leading card in the station also engages the periphery of the drum 12. Therefore, the vacuum pressure at the periphery of the drum 12 tends to withdraw the leading card from the feed station 18, but the vacuum pressure which is established at the face of the feed head 50 overcomes that tendency and holds the card in the station.

A suitable solenoid-controlled valve is included in the line to the feed head 50 so that the vacuum pressure at the head can be controllably interrupted. Whenever such an interruption is effectuated, the leading card is drawn by the drum 12 out of the feed station 18 and through a throat formed by the leading edge of the trailing wall of the station and the periphery of the drum 12. The dimensions of this throat are such that a single card only may be released from the station at any particular time. Therefore, by controlling the actuation of the solenoid valve in the feed line of the feed head 50, the leading card may be released from the feed station 18 whenever such a release is desired.

The released card is carried on the periphery of the drum 12, and it may be transferred to the vacuum transport drum 14 by a gate transfer mechanism 52. This gate transfer mechanism may be similar to the mechanism described in copending application 562,152 which was filed January 30, 1956, in the name of Peck et al. The gate transfer mechanism 52 will also be described in some detail in conjunction with FIGURE 5. This mechanism is controlled to emit streams of a pressurized fluid, such as air, tangentially of the periphery of the drum 12. Whenever such streams are emitted, a card coming under their influence is stripped from the periphery of the drum 12 and brought under the influence of the vacuum pressure at the periphery of the drum 14. The master card is thereby transferred to the drum 14 so that it may be carried by it past the transducer head 24 to receive the required magnetic identifying data.

The drum 16, as noted above, is driven intermittently at a relatively low speed. This latter drum also is constructed to provide a vacuum pressure at its peripheral surface. Unlike the drums 12 and 14, the periphery of the low speed drum 16 is provided with a series of axially extending ribs 54 which are equi-angularly spaced about the periphery by distances corresponding to the length of the cards. These ribs define a series of peripheral pockets about the drum 16 which serve to receive the cards transferred to the drum 16 from the drum 14.

A further gate transfer mechanism 56 is mounted on the table top 11 adjacent the contiguous point of the drums 14 and 16. The gate transfer mechanism 56 may be similar in its construction to the gate transfer mechanism 52. The gate transfer mechanism 56 produces controllable streams of pressurized fluid such as air tangentially of the periphery of the drum 14. When a card is carried by the periphery of the drum 14 into the vicinity of these streams, its leading edge is forced outwardly from the drum and is carried by the drum into arresting engagement with one of the ribs 54 on the periphery of the drum 16, which is rotating intermittently at a slower speed than the drum 14. As the drums 14 and 16 rotate, the leading edge of the card to be transferred is peeled out from the periphery of the drum 14 by the pressurized streams from the gate 56, and this card rides up over a gate transfer mechanism 58 which is mounted adjacent the gate transfer mechanism 56. The leading edge of the card then strikes a slow-moving rib 54 which arrests the card so that it slides on the periphery of the drum 14. Then as the drum 16 slowly rotates in its intermittent manner, the card is transferred to the periphery of the drum 16, with the transferred card lying in one of the peripheral pockets defined by a corresponding pair of the ribs 54.

The gate transfer mechanism 58 may be constructed in a manner similar to the gate transfer mechanisms 52 and 56, and it serves to produce streams of pressurized fluid tangentially of the drum 16 to transfer cards from that drum back to the periphery of the drum 14. Likewise, a gate transfer mechanism 60 is mounted adjacent the gate transfer mechanism 52, and it too may have a similar construction to the other gate transfer mechanisms. The gate transfer mechanism 60 serves to return the cards from the drum 14 to the drum 12. The returned cards are then carried by the drum to the stack station 20.

The stack station 20 is equipped with a stack head 62, this stack head being mounted on the table top 11 adjacent the trailing wall of the stack station 20 (with respect to the rotation of the drum 12). The stack head 62 has fingers which extend into close proximity with the periphery of the drum 12. Each card transported by the drum across the mouth of the station 20 rides up over the fingers of the stack head 62 and is arrested by the stack head. The arrested card extends across the mouth of the station 20. A stationary pick-off member 64 is mounted on the table top 11 adjacent the leading wall of the stack station 20. This pick-off member is displaced angularly from the stack head 62 by a distance which is less than the length of the cards. The pick-off member is bulged outwardly from the periphery of the drum 12, and it also has fingers which extend into close proximity with the periphery of the drum. The arrested card, therefore, first rides up over the pick-off 64 and is arrested across the mouth of the stack station 20 with its trailing edge held out from the periphery of the drum 12. The next succeeding card then passes up over the pick-off and under the preceding card to deposit the preceding card in the stack station. In this manner, the cards are stacked in the station 20 in their proper sequence, and any tendency for jamming is avoided.

The microfilm is drawn past a suitable exposing lamp 66 at the exposure station 26. This station may include the usual photographic equipment and synchronous drive for the microfilm to enable a plurality of frames from the microfilm to be exposed onto the photographic emulsion of each master card. This exposure, as noted, occurs when a master card is arrested by the intermittently driven drum 16 at the exposure station. After such exposure, the master card is carried to the developing station 28 so that the documentary images may be developed, and the master card is then returned to the stack station 20.

In a manner to be described, the feed head 50 of the feed station 18 is first controlled to release a master card. The gate 52 is then activated at the proper time to transfer the master card to the drum 14. A selected recording from the magnetic tape 22 is written on the master card by the write transducer 24, and the gate transfer mechanism 56 is subsequently activated to transfer the card to the drum 16. The card is then carried to the exposure station 26 so that the documentary images from the microfilm may be exposed onto it, which images pertain to the document corresponding to the magnetic data recorded on the card from the punched tape.

The master card is then carried to the developing station 28, and the gate transfer mechanism 58 is activated at the proper time to return the card to the drum 14. The gate transfer mechanism 60 is then activated to transfer the card back to the drum 12, and the card is carried to the stack station 20 for stacking in that station. When the above-described operations have been completed, a second master card is automatically released from the station 18 to undergo the same treatment. The end result is a stack of master cards in the station 20, with each stack containing groups of photographic documentary images and corresponding identifying magnetically recorded information.

Figure 4:
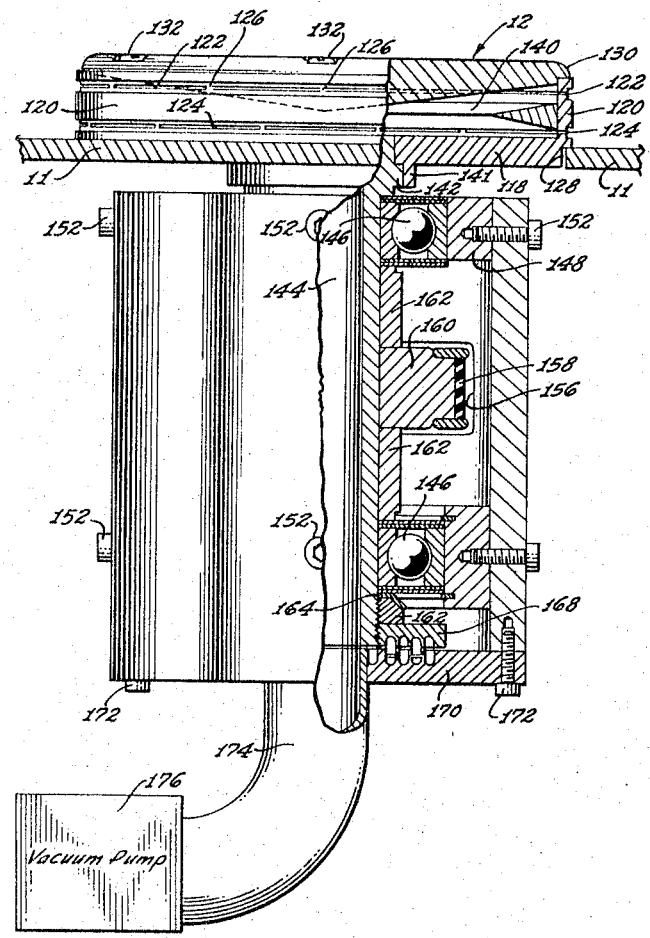
FIGURE 4 is a partial sectional view substantially on the line 4—4 of FIGURE 3 to show the constructional details of a vacuum pressure transporting drum which forms one of several similar transporting media which are used in the apparatus of FIGURE 3.

The drums 12, 14 and 16 may be constructed in a manner similar to that described in Patent No. 2,883,189, issued to Loren Wilson. Such a drum will be described in conjunction with FIGURE 4. As noted above, FIGURE 4 is a representation of the drum 12. However, the drums 14 and 16 may be similarly constructed. Of course, other transport media may be used, and the rotatable transport drums are described in this application merely as a convenient example of an appropriate transport medium.

When so desired, the drums 12 and 14 may be stationary, and the cards may be driven around their peripheries by air streams in accordance with Bernoulli principles.

As fully described in the Wilson Patent No. 2,883,189, the drum 12 is provided with a lower section and an upper section. The lower section of the drum includes a disk-like bottom portion 118 and an integral annular side portion 102. A pair of axially spaced peripheral slots 122 and 124 extend through the side portion 120. The slots 122 and 124 extend completely around the periphery of the side portion 120. In order to retain the integral construction of the side portion 120, this portion may be reinforced at its inner surface by a plurality of ribs 126. A pair of axially spaced peripheral grooves extend around the peripheral surface of the side portion 120. These grooves are respectively positioned adjacent the slots 122 and 124, and they receive the above-described finger-like portions of the stack head 62 and of the pick-off 64 associated with the stack station 20.

The disk-like bottom portion 118 of the lower section of the drum is undercut as shown at 128. This enables the table top 11 to extend beyond the outer limits of the side portion 120 so that the side portion overlaps the table top in the manner shown. Therefore, the cards supported endwise on the table top by the feed station 18 and by the stack station 20 have no tendency to slip down between the table top and the drum and thereby become misplaced or damaged.

The upper section of the drum is in the form of a disk-like member 130 which engages the annular side member 120 of the lower section. The upper section 130 forms an enclosure with the lower section of the drum, with the upper section parallel to the disk-shaped bottom portion 118 of the lower section. The upper section 130 is held in place on the side portion 120 by a plurality of screws 132.

When one of the cards is fed from the feed station 18 to the drum 12, this card is held on the outer peripheral surface of the side portion 120 of the drum by vacuum pressure.

A deflector ring 140 is supported within the interior of the drum 12 in press fit with the inner surface with the annular side portion 120. This deflector ring is tapered towards the center of the drum to minimize the turbulence o fair flowing through the drum and to provide a streamlined path for the air which is drawn in through the orifices 122 and 124. The undersurface of upper section 130 is bulged to have a convex shape. This convex shape cooperates with the ring 140 in providing a smooth path for the air drawn in through the orifices 122 and 124.

A portion 118 of the lower section of the drum 12 contains a central opening which is defined by an annular collar 141. The collar 141 fits on a second collar 142 positioned at the end of a vertical shaft 144. This shaft extends into the opening in the lower portion 118 of the drum in press fit with that portion. Therefore, rotation of the hollow shaft 144 causes the drum 12 to rotate. Moreover, the interior of the shaft 144 communicates with the interior of the drum 12.

Bearings 146 are provided at opposite ends of the shaft 144. The inner races of the bearings 146 are mounted on the shaft 144, and the outer races of these bearings are disposed against bushings 148. The bushings 148 are secured to a housing 150 by a plurality of studs 152.

An opening 156 is provided in the housing 150 between the bearings 146 so that a drive belt 158 may extend through the opening into the housing 150 and around a pulley 160. The pulley 160 is keyed to the shaft 144 between the bearings 146, and the pulley is held against axial movement by a pair of sleeves 162. These sleeves are mounted on the shaft 144 and are respectively positioned between the pulley and respective ones of the bearings 146.

The bearings 146 and the sleeves 162 are held on the shaft 144 by a nut 166. This nut is screwed on a threaded portion at the bottom of the shaft, and a lock washer 164 is interposed between it and the lower bearing 146. A sealing disk 168 is also screwed on the threaded portion at the bottom of the shaft 144. The sealing disk 168 operates in conjunction with a bottom plate 170 to resist the movement of air between the interior of the housing 150 and the interior of the hollow shaft 144 when a pressure differential exists between the housing and the shaft.

The bottom plate 170 is secured to the housing 150 by a plurality of studs 172, and the bottom plate has a central circular opening. A hollow conduit 174 extends into the opening in the bottom plate 170 and in friction fit with that plate. A conduit 174 is axially aligned with the hollow shaft 144 so that air may be exhausted from the hollow interiors of the shaft and the conduit by a vacuum pump 176. This pump may be of any suitable known construction and for that reason is shown in block form only.

The vacuum pump 176 draws air inwardly through the slots 122 and 124 and through the interior of the drum 10 downwardly through the shaft 144 and through the conduit 174. This creates a vacuum pressure at the outer peripheral surface of the annular portion 120 of the lower section of the drum 10. The deflector ring 140 and the convex under side of the section 130 assures that air will flow smoothly and with a minimum of turbulence. This enables a high and adequate vacuum pressure to be produced around the outer surface of the annular side portion 120 firmly to retain the cards on that surface.

Figure 5:
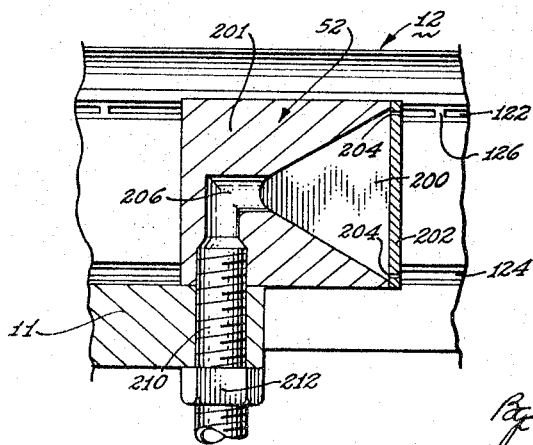
FIGURE 5 is a sectional view substantially on the line 5—5 of FIGURE 3 and showing the details of one of the gate transfer mechanisms which are used in the apparatus of FIGURE 3 to effect a transfer of cards from one transport drum to another.

Details of the gate transfer mechanism 52 are shown in FIGURE 5. As noted above, the gate transfer mechanisms 60, 56 and 58 may be similarly constructed. As also noted, each of these gate transfer mechanisms is constructed to emit a pressurized stream of fluid tangentially of the drum with which it is associated. The individual gate transfer mechanisms are also positioned to be spaced a slight distance from the periphery of their associated drums to enable cards to be transferred past them by the drums when the streams of pressurized fluid from respective ones of the gate transfer mechanisms are interrupted.

The gate transfer mechanism 52, as mentioned above, is positioned at the contiguous point between the vacuum transport drums 12 and 14. As also noted, the gate is positioned in a generally tangential relation with the periphery of the drum 12, but is spaced from the periphery a distance sufficient to allow cards on the drum 12 to be circulated by the drum past the gate when its pressurized streams are interrupted.

As illustrated in FIGURE 1, the gate 52 has a plan shape corresponding essentially to a tear drop, and it is symmetrical about its central axis. This central axis, as previously mentioned, is tangential to the periphery of the drum 12.

The gate 52 has such a tapered configuration so that its narrow end or mouth may be adjacent the periphery of the drum 12. It has a body portion 201 which has a hollow interior 200 of an essentially bell-shaped configuration. This hollow interior defines a mouth portion shown in FIGURE 5, and a thin strip 202 is mounted across the mouth portion. This strip is provided with a pair of apertures 204, and these apertures extend through the strip in respective alignment with the peripheral slots 122 and 124 in the drum 12. The gate transfer mechanism 52 is constructed so that the pressurized fluid such as air which is introduced into its hollow interior 200 may pass through the apertures 204 to constitute high pressure streams. Also, the gate is positioned so that the streams emerging from the apertures 204 extend in alignment with the peripheral slots 124 and 126 of the drum in essentially tangential relationship with the drum.

A passageway 206 extends back from the interior 200 of the gate transfer mechanism, and this passageway bends downwardly to communicate with a threaded tubular nipple 210. The nipple 210 extends down through an aperture in the table top 11 and is held in place by a nut 212. The nut 212 is threaded to the nipple 210 and engages the underside of the table top. The gate transfer mechanism may be mounted, therefore, by inserting the tubular nipple 210 in the aperture in the table top 11, and then by tightening the nut 212 after the gate transfer mechanism is given its proper angular position. This angular position is such that the streams of pressurized fluid from the apertures 204 pass tangentially of the drum 12, and the position is also such that the gate is spaced slightly from the periphery of the drum to enable cards to be circulated past it by the drum when the pressurized fluid is interrupted. The tubular nipple 210 may be coupled to a suitable source of pressurized fluid by an appropriate feed line, and a solenoid actuated valve may be mounted in the feed line to control the introduction of pressurized fluid to the gate transfer mechanism.

As noted previously, the operations described above are controlled automatically by the logic control system of FIGURE 6. The system of FIGURE 6 includes a source of direct voltage 220 which has a grounded common terminal, as well as a positive terminal and a negative terminal.

The transcriber for the punched tape 22 of FIGURE 1 includes a series of four transducer heads 24a, 24b, 24c and 24d. Each of these heads is positioned to scan a different row of punched data on the punched tape 22. The punched tape, as shown in FIGURE 6, may, for example, include a top row which contains a perforation at the end of each set of identifying data, and these top row punchings serve to control the release of cards from the feed station 18. The other heads process the punched identifying data on the tape to produce electrical signals corresponding to the coded equivalent of the particular document number and page numbers which are to be inscribed on the different master cards.

The transducers 23a, 23b, 23c and 23d are connected respectively to a plurality of amplifiers 222, 224, 226 and 228 in the transcriber. The transducer 24 of FIGURE 3 is represented in FIGURE 6 by a group of transducer heads 24a, 24b and 24c. These heads are positioned to process different rows of the magnetic storage area of each master card, as such card is transported past these heads by the drum 14. The heads 24a, 24b and 24c are usual electro-magnetic write heads, and they receive signals from respective ones of the amplifiers 224, 226 and 228. It is evident that the number of heads 23b, 23c, 23d, and 24a, 24b and 24c will correspond to the number required to read all the rows of identifying data which are to be transferred from the punched tape 22 onto the magnetic storage portion of the master cards. Three such heads are shown for each group in FIGURE 6 for purposes of simplicity.

The amplifier 222 is connected to the left input terminal of a flip-flop 230. The flip-flop 230, and those to be referred to subsequently in the present specification, may be any known type of bistable relaxation network. Flip-flops are well known to the digital computer and related arts. These networks are usually equipped with a pair of input terminals and a pair of output terminals, and they are triggered from one state to another by a negative-going pulse introduced to these input terminals. For example, when a negative-going pulse is introduced to the left input terminal of the flip-flop 230 it is triggered to a true state in which a relatively high voltage is produced at the left output terminal. The flip-flop will remain in that state indefinitely, and until a negative-going pulse is introduced to the right input terminal. When that occurs, the flip-flop is triggered to a false state at which a relatively high voltage is exhibited at its right output terminal and a relatively low voltage is produced at its left output terminal.

The amplifier 222 is also connected to a delay line 232, of any known construction, and the output terminal of the delay line connects with the right input terminal of the flip-flop 230.

The left output terminal of the flip-flop 230 is connected to the control grid of a triode 234. The cathode of this triode is grounded, and a resistor 236 is connected to the control grid and to the negative terminal of the source of direct voltage 220. The actuating winding of the feed head 50 is connected to the anode of the triode and to the positive terminal of the source 220. This activating winding is associated with the solenoid valve which controls the vacuum pressure at the feed head. Whenever the triode 234 is rendered conductive, a current flows through this winding to close the valve and interrupt the vacuum pressure. Therefore, a card may be released from the feed station 18, each time the flip-flop 230 is triggered to a true state. When that occurs, the relatively high voltage at the left output terminal of the flip-flop causes the triode 234 to become conductive so that the card will be released. The delay time of the delay line 232 is such that the flip-flop 230 is returned to a false state, and the triode 234 is rendered non-conductive, as soon as a single card has been released from the feed station 18 and before a second card is released.

The amplifier 222 is also connected to a delay line 238, and the delay line supplies its output signal to the left input terminal of a flip-flop 238 and to the input terminal of a delay line 240. The output terminal of the delay line is connected to the right input terminal of the flip-flop 238, and the left output terminal of the flip-flop connects with the control grid of a triode 242. The control grid is connected to one terminal of a resistor 244, and the other terminal of the resistor is connected to the negative terminal of the source of direct voltage 220.

Like the triode 234, and like the triode circuits which will be described, the triode 242 is biased by the source 220 to a non-conductive state when the flip-flop 238 is in its false state. However, when the flip-flop 238 is triggered to a true state, the resulting high voltage at its left output terminal is sufficient to overcome the negative bias on the triode 242 and to render the triode conductive. Likewise, whenever the flip-flop 230, and the flip-flops which will be described and which are respectively associated with the triodes to be described, are triggered to their true states, the corresponding triode is rendered conductive.

The activating winding of the solenoid valve of the gate transfer mechanism 52 is included in the anode circuit of the triode 242, this winding having one terminal connected to the anode of that triode and having its other terminal connected to the positive terminal of the source 220. Whenever the triode 242 is rendered conductive, the resulting current flow through the activating winding causes the solenoid valve to open so that the gate transfer mechanism 52 is capable of emitting streams of pressurized fluid to transfer each card coming within their influence from the drum 12 to the drum 14.

The amplifier 222 is also connected to the armature of a switch 246. This switch is closed during the operation now being described. However, for an operation of the system to be described subsequently, this switch is opened. The fixed contact of the switch 246 is connected to a group of delay lines 248, 250 and 252.

The delay line 248 is connected to the left input terminal of a flip-flop 250 and to a delay line 252. The output terminal of the delay line 252 connects with the right input terminal of the flip-flop 250. The left output terminal of the flip-flop 250 is connected to the control grid of a triode 254. The control grid is connected to a resistor 256 which, in turn, is connected to the negative terminal of the source 220 of direct voltage. The cathode of the triode 254 is grounded, and the anode of this triode is connected to one terminal of the activating winding of the solenoid valve associated with the gate transfer mechanism 56. The other terminal of this winding is connected to the positive terminal of the source 220. Whenever the flip-flop 250 is triggered to a true state, the triode 254 is rendered conductive to energize the winding of the solenoid valve and to open the valve so that the gate transfer mechanism 56 can emit streams of pressurized fluid tangentially of the peripheral surface of the drum 14.

The delay line 250 connects with the left input terminal of a flip-flop 258. A delay line 260 is connected between the left input terminal of the flip-flop 258 and its right input terminal. The left output terminal of the flip-flop 258 is connected to one of the input terminals of an "and" network 262. The "and" network has a second input terminal which is connected to the output terminal of a single-shot multivibrator 264. A switch 266 is mechanically coupled to the shaft of the low speed intermittent transport drum 16. This switch, or series of switches in parallel, is controlled to close each time the drum enters into a dwell interval as it is intermittently rotated.

"And" networks, such as the network 262, are well known to the electronic digital computer art. In present day systems, these "and" networks are usually constructed to include transistors or diodes. The transistors or diodes in the network are so connected that the network is capable of passing a signal to its output terminal, only when each of its input terminals has a signal introduced to it, and upon the simultaneous introduction of such input signals.

Single-shot multivibrator networks are equally well known to the electronic digital computer art, and to the electronic art in general. This network is a mono-stable relaxation oscillator. In the present embodiment, it responds to an instantaneous ground connection on its input terminal to be triggered from a stable state to an unstable state. It then returns to its stable state after a predetermined interval. Therefore, each time the switch 266 is actuated, the multivibrator 264 is caused to generate an output pulse. This output pulse has a duration which is determined by the internal parameters of the multivibrator 264, and which is independent of the interval of closure of the switch 266.

The output terminal of the "and" network 262 is connected to the left input terminal of a flip-flop 268 and to a delay line 270. The output terminal of the delay line 270 is connected to the right input terminal of the flip-flop 268.

The left output terminal of the flip-flop 268 is connected to the control grid of a triode 272. The cathode of the triode 272 is grounded, and the control grid of the triode is connected to one terminal of a resistor 274. The other terminal of the resistor 274 is connected to the negative terminal of the source 220. The anode of the triode 272 is connected to the activating winding of a control relay 276, the other terminal of this winding being connected to the positive terminal of the source 220. The control relay 276 may have a usual construction which is well known to the photographic art. When the winding of the control relay is energized, the relay functions to activate the lamp 66 of FIGURE 3 so that the exposure of the seven microfilm frames onto the master card may take place. Then, at the end of a timed interval, this relay serves to deactivate the exposure lamp, and to advance the microfilm so that the next seven frames are brought into the exposing position, so that they may be exposed onto the next master card.

The delay line 252 connects with the left input terminal of a flip-flop 278 and with the input terminal of a delay line 280. The delay line 280 is connected to the right input terminal of the flip-flop 278, and the left output terminal of the flip-flop is connected to the control grid of a triode 282. A resistor 284 is connected to the control grid of the triode 282 and to the negative terminal of the source of direct voltage 220. The cathode of the triode 282 is grounded, and the anode of this triode is connected to the activating winding of the solenoid valve associated with the gate transfer mechanism 58. The other terminal of this winding is connected to the positive terminal of the source 220. Whenever the flip-flop 278 is triggered to a true state, the triode 282 is rendered conductive, and the gate transfer mechanism 58 is caused to emit streams of pressurized fluid to effect a transfer of a card from the drum 16 back to the drum 14.

The amplifier 222 is further connected to a delay line 286, and this delay line has an output terminal connected to the left input terminal of a flip-flop 288 and to the input terminal of a delay line 290. The output terminal of the delay line 290 is connected to the right input terminal of the flip-flop 288. The left output terminal of the flip-flop 288 is connected to the control grid of a triode 292. A resistor 294 is connected to the control grid of the triode 292 and to the negative terminal of the source 220. The cathode of the triode 220 is grounded, and its anode is connected to one terminal of the activating winding of the solenoid valve associated with the gate transfer mechanism 60. The other terminal of this valve is connected to the positive terminal of the source of direct voltage 220. Whenever the flip-flop 288 is triggered to a true state, the triode 292 is rendered conductive, and the resulting current flows through the winding of the solenoid valve associated with the gate transfer mechanism to obtain an emission of streams of pressurized fluid for transfer purposes.

As the tape 22 is drawn past the transducer heads 23a, 23b, 23c and 23d, a punching in the top row of the tape is sensed by the head 23a, and this causes the amplifier 222 to develop a positive-going pulse. This pulse is introduced to the left input terminal of the flip-flop 230, and the negative-going trailing edge of this pulse triggers the flip-flop to a true state. This causes the triode 234 to become conductive, so that a card is released from the feed station 18 to the periphery of the drum 12. As described above, the delay line 232 returns the flip-flop 230 to a false state before a second card has a chance to be released from the feed station.

The released card is carried on the periphery of the drum 12 to the gate transfer mechanism 52. The delay line 236 delays the pulse from the amplifier 222 so that the flip-flop 238 is triggered to a true state at the same time that the released card is brought into the environment of the gate transfer mechanism 52. This causes the gate transfer mechanism 52 to emit its streams of pressurized fluid at the proper time to transfer the released card to the drum 14.

The released card is now carried by the drum 14 past the transducer heads 24a, 24b and 24c. A usual buffer may be used, or the drive of the punched tape 22 may be synchronized, so that the released master card reaches the heads 24a, 24b and 24c at the same time that the transducer heads 23b, 23c and 23d process the identifying data on the punched tape corresponding to the released master card. This data is therefore transferred to the master card and appears in its magnetic storage area as a magnetic recording. As noted, this recording is a coded indication of the document number and the page numbers of the documentary images that are to be transcribed on the master card.

After the master card has received the magnetic recordings from the transducer heads 24a, 24b and 24c, it is carried by the drum 14 into the proximity of the gate transfer mechanism 56. The switch 246 is closed during the transcribing and recording operation now being described and covered by FIGURES 1 to 6, inclusive, and the delay line 248 causes the pulse from the amplifier 222 to trigger the flip-flop 250 to its true state at the proper time to activate the gate 56 so that the released master card may be transferred by it to the low speed intermittent drum 16. In the manner described, the card from the high speed drum 14 is brought against one of the ribs 54 of the drum 16 and held there until the intermittent rotation of the drum 16 carries the card past the gate transfer mechanisms 56 and 58.

The master card is now carried by the drum 16 past the exposure station 26. The delay line 250 assures that the flip-flop 258 will be triggered to a true state by the pulse from the amplifier 222 at the exact time that the card on the drum 16 is carried to the exposure station 26. The "and" network 262 is therefore conditioned for translation when the master card is brought to the exposure station. Then, when the low speed disk 16 enters its next full dwell interval, the multivibrator 264 generates an output pulse which is translated by the "and" network 262 to trigger the flip-flop 268. This assures that the flip-flop 268 will be triggered to a true state at the start of a dwell period of the intermittently driven drum 16. This, in turn, assures that the photographic equipment at the exposure station will be activated at the start of a dwell period. This obviates any possibility of the master card being moved during the exposure operations.

When the flip-flop 268 is triggered to a true state, the triode 272 is rendered conductive so that the relay 276 is activated. Then, and in the described manner, the corresponding seven frames of the microfilm are exposed onto the master card. The master card is then carried to the developing station 28, and it emerges from the latter station with its documentary images recorded on its photographic section, and with the identifying magnetic data recorded on its magnetic storage section.

The card is now transported by the drum 16 to the gate transfer mechanism 58. The delay line 252 assures that the flip-flop 278 will be triggered to its true state at the proper moment to activate the gate 58 and to transfer the master card back to the drum 14. The delay line 280, like the delay lines 240, 252 and 290, returns its associated flip-flop to a false state to turn off the corresponding gate transfer mechanisms after each card transfer has been completed.

The master card is now carried on the drum 14 to the gage transfer mechanism 60. The delay line 286 assures that the flip-flop 288 will be triggered to a true state at the proper time to activate the gate 60 and transfer the master card back to the drum 12. The master card is then carried to the stack station 20 and is arrested at that station in the described manner. These operations all occur before the next release punching on the tape 22 is read by the transducer head 23a. When the next release punching is so read by that transducer head, the next card is released from the feed station 18 and the operations are repeated on that card. These operations are continued until each card contains its group of photographic images from the microfilm, with each group being identified by magnetic information from the punched tape corresponding to the proper document numbers and page numbers.

There are now a series of master cards in the stack station 20, each bearing a group of document images which are identified by the document number. However, the document itself may have several fields of applicability. For example, a designation as to "Los Angeles" may have applicability in different classifications such as "California," "United States," "North America" and "cities." For that reason, the present invention provides a separate index card for each different field of application of the document. Within the concepts of the present invention, a group of index cards for each document is made up and the documentary images from the master cards are transferred to each index card bearing the same document number, and the index cards are then automatically placed in different files corresponding to the different areas of applicability of the document in question.

Each document, as it is received, is studied and for each area of applicability, an indexing record is produced. This indexing record will include the document number, an identification of the subject of coverage, and any additional pertinent information which should be included. The resulting record is punched onto a paper tape in known manner and by the use of known equipment. The record, or portions of it, is repeated on the tape for each different field of applicability so that a separate index card for each such field may be made up. Then, by use of apparatus similar to that described in conjunction with FIGURES 3 and 6, a stack of index cards from the feed station 18 receives the data from the punched tape, and these cards are stacked in the stack station 20. For the latter operations, however, the switch 246 is opened so that there will be no transfer of these latter cards onto the drum 16. The cards in the stack station 20 now have recordings on their magnetic storage areas only. These recordings will include the document number, the index record as described above, and there may be several of such cards for each previously prepared master card depending upon how many different areas of applicability the document in question may have.

It will be assumed that the index cards in their stack are sorted in an ascending or descending progression of document numbers. If, for any reason, the master cards in their stack or the index cards in their stack become unsorted, appropriate sorting equipment may be used to sort these cards in their individual stacks as an ascending or descending progression of document numbers.

The next step is to transfer the documentary images from each master card onto the index cards associated with the master card. It will be remembered that a stack of master cards has previously been obtained, and each master card in the stack is identified by a document number. For purposes of simplicity, it will be assumed that a different document is represented by each master card. However, as described above, the same document may have different pages on each of a group of master cards. It will also be assumed that the document numbers recorded on the master cards are in an ascending or descending progression. That is, the master cards in the stack are sorted with respect to their document numbers.

Also, it will be assumed that a stack has been provided which includes a plurality of index cards. Each index card in the stack is identified by a document number corresponding to a document number on an equivalent master card. However, each master card may have several index cards in the second stack, as indicated above.

The apparatus to be described in conjunction with FIGURES 7 and 8 is capable of taking the cards of the master stack and of the index stack described above and collating the cards into a single stack. The result of this collating process is to provide a single stack in which each master card bearing a particular document number is followed by all the index cards having the same document number. The collating apparatus is shown as a top plan view in FIGURE 7 and the logic control system for the apparatus is shown in FIGURE 8.

The apparatus of FIGURE 7 includes suitable transport means such as rotatable vacuum pressure transporting drum 310. The drum 310 may be rotatably mounted on a suitable horizontal table top 311, and the drum is considered as being rotatable in a counterclockwise direction. A second horizontal rotatable vacuum pressure transporting drum 312 may also be mounted on the table top 311. Likewise, a third or common rotatable vacuum pressure transporting drum 314 is mounted on the table top 311 to be adjacent both the drums 310 and 312. The drum 312 is rotatable in a counterclockwise direction, and the drum 314 is rotatable in a clockwise direction.

The drums 310, 312 and 314 may be constructed in a manner similar to the drum 12 described above.

A first gate transfer mechanism 316 is mounted on the table top 311, and this gate transfer mechanism is disposed between the drums 310 and 314 near the contiguous point of these two drums. The gate transfer mechanism 316 may be similar to the gate transfer mechanism 52 described above. The gate transfer mechanism 316 is constructed to emit streams of pressurized fluid, such as air, in a tangential direction relative to the periphery of the drum 310. These streams of air cause a card transported on the periphery of the drum 310 and coming under their influence to be stripped from the drum 310 and transferred to the peripheral surface of the drum 314.

A similar gate transfer mechanism 318 is mounted on the table top 311, and this latter gate transfer mechanism is positioned to direct streams of fluid, such as air, under pressure in a tangential direction relative to the periphery of the drum 312. In the same manner as the streams of air from the gate 316, the streams of pressurized air from the gate 318 effectuate the transfer of cards coming under their influence from the drum 312 to the drum 314. Both the gate transfer mechanisms 316 and 318 may be continuously activated when the apparatus of FIGURE 7 is in operation.

A first feed type of card holding station 320 is positioned on the table top 311 with its mouth adjacent the periphery of the drum 310. This feed station 320 is constructed in the same manner as the feed station 18 of FIGURE 3, and it is intended to hold the master cards, for example, in a stacked condition with the lower edges of the cards resting on the table top 311.

In the described manner, a vacuum pressure is established at the periphery of the drum 310. This vacuum pressure tends to withdraw the leading card from the station 320 so that the leading card may be transported on the periphery of the drum. The release of the leading card from the station is opposed, however, by a vacuum pressure feed head 322 which is similar to the feed head 50 of FIGURE 3.

The feed head 322 is mounted adjacent the leading wall of the station 320, and it extends partially across the mouth of the station to engage the face of the leading card in the station. A vacuum pressure is established at the feed head 322 which is sufficient to overcome the tendency of the drum 310 to withdraw the leading card from the station 320. However, a solenoid-actuated valve 324 is interposed in the line coupling the feed head 322 to a suitable vacuum pressure source. The solenoid valve 324 is controlled in a manner to be described so that the vacuum pressure exerted by the feed head 322 on the leading card in the station 20 may be controllably interrupted. Whenever the vacuum pressure is so interrupted, the leading card is released from the station 320 to the periphery of the drum 310. The solenoid valve 324 is normally open, and when it is energized it closes to interrupt the vacuum pressure at the feed station.

A plurality of electromagnetic transducer heads, represented by the transducer 326, are mounted on the table top 11 adjacent the trailing wall of the station 320. The transducer 326 is placed as close to the trailing wall as possible. The purpose of the transducer 326 is to process each master card released from the input station 320 immediately upon the release of the card.

A hold station 328 is also mounted on the table top 311, and the hold station 328 is positioned adjacent the periphery of the drum 310. This hold station may be similar to that described in copending application Serial No. 638,033, filed February 4, 1957, in the name of Alfred M. Nelson, et al.; or in copending application Serial No. 689,347, filed October 10, 1957, in the name of Eric Azari et al. The hold station is positioned on the table top 311, and each card transported by the drum 310 rides up and over a pick-off member included in the station. A vacuum pressure is controllably established at the surface of the pick-off member so that any card transported over it may be controllably arrested and held.

The vacuum pressure is supplied to the pick-off member in the hold station 328 from a suitable vacuum pressure source and through a feed line 331. This feed line includes a solenoid valve 330. Whenever the solenoid valve 330 is not energized, it is open and the resulting vacuum pressure at the hold station 328 arrests any card transported on the periphery of the drum 310 and riding up over its pick-off member. However, when the solenoid valve 330 is energized, the vacuum pressure at the hold station is interrupted so that the held card is released.

A feed station 332 (similar to the feed station 320) is positioned on the table top 311 with its mouth adjacent the periphery of the drum 312. An electromagnetic transducer 334, which also may include a plurality of transducer heads, is positioned directly adjacent the trailing wall of the feed station 332. A hold station 336 is positioned on the table top 311, and this latter hold station is preferably displaced from the trailing wall of the feed station 332 by a distance corresponding to the length of an individual information card or by a distance slightly greater than that length. The hold station 336 may be similar to the hold station 328 in its construction and positioning with respect to its associated feed station. A solenoid actuated valve 338 is interposed in the line coupling the hold station 336 to a suitable vacuum pressure source (not shown).

A controllable vacuum pressure feed head 340, which may be similar in its construction to the feed head 50 of FIGURE 3, is mounted on the table top 311. The feed head 340 extends through the leading wall of the feed station 332 partially across the mouth of that station. In a manner similar to the operation of the feed head 422, the feed head 340 controls the release of cards from the feed station 332. A solenoid-actuated valve 342 is mounted in the line coupling the feed head 340 to a suitable vacuum pressure source.

A stack station 344 is mounted on the table top 11 with its mouth adjacent the periphery of the drum 314. This stack station, like the stack station 20 of FIGURE 3, may be similar to the stack station disclosed and claimed in copending application 571,088, filed March 12, 1956, in the name of Minoru T. Endo. The stack station includes a stack head 346 which is disposed adjacent the trailing wall of the station. A pick-off member 348 is mounted adjacent the leading wall of the station 344. The pick-off member has a bulged configuration extending outwardly from the periphery of the drum 341. This pick-off may be similar to the pick-off 64 of FIGURE 3.

Any card transported on the periphery of the drum 314 is brought by the drum to the mouth of the stack station 344. Such card, as in the previous embodiment, rides up over the pick-off 348, and it is arrested at the mouth of the station 344 by the stack head 346. The trailing end of the arrested card projects over the pick-off 348, and the next succeeding card transported on the periphery of the drum 341 is brought by the drum over the fingers 348a and under the preceding card. The subsequent card is also arrested by the stack head 346, and it serves to deposit the former card in the stack station 344. In this manner, all the cards transported on the periphery of the drum 314 are deposited in sequence in the stack station 344.

In a manner to be described, the stacks of master cards and index cards to be merged are placed respectively in the feed stations 320 and 332. It will be understood that these cards are to be merged into the stack station 344, and that the single stack of cards in the stack station will be so arranged that they exhibit a logical sequence of document numbers from one card to the next. The arrangement will be such that each master card will be followed by the index cards having a corresponding document number. These document numbers will be assumed to be recorded on the various cards in the form of multi-digit binary numbers so that appropriate registers in the logic control circuit of FIGURE 8 may respond to these numbers to provide the proper merge type of collating operation.

As pointed out above, the master and index cards in the individual feed stations 320 and 332 are in a sorted condition so that they exhibit a sequence of binary numbers which correspond to the document numbers represented by the cards. In describing the operation of the system, the binary numbers in the progression will be assumed to be ascending from one card to the next to represent an ascending order of document numbers in each of the feed stations 320 and 332. It will also be assumed that the binary numbers corresponding to these document numbers are disposed at a particular position on each card to enable a parallel read-out to be made at that position to determine the different document numbers.

After the stacks of cards have been placed in the feed stations 320 and 332, the feed heads 322 and 340 are both momentarily deactivated to release one card from each station. The released cards are read by the transducers 326 and 334 respectively, and the hold stations 328 and 336 are selectively controlled in a manner to be described so that the card released from the master stack is held at the hold station and the card released from the index stack is allowed to proceed to the stack station 344. If the card is released from the hold station 336 and carried on the drum 312, that card is transferred by the gate 318 to the drum 314 to be stacked in the stack station 344. Conversely, if the card is released from the hold station 328 and carried by the drum 310, the latter card is transferred to the drum 314 by the gate transfer mechanism 316. The transferred card is then carried by the drum 314 to the stack station 344. Whenever a card is released from the hold station 328 or from the hold station 336, a new card is released from the corresponding feed station 320 or 332.

For the merging-collating process, the master cards may be assumed to be in the feed station 320 and each master card released from the feed station 320, for example, is held at the hold station 328. At this time, successive index cards are released from the feed station 332 and deposited in the proper sequence in the stack station 344. This continues as long as the binary number corresponding to the documentary numbers from successive index cards from the input station 332 equals the binary number corresponding to the document number of the master card held at the hold station 328.

When a released index card from the feed station 332 exhibits a document number different from the master card held at the hold station 328, the released index card is held at the hold station 336 and the release of subsequent index cards from the feed station 332 is immediately stopped. The master card from the hold station 328 is released and replaced by a new master card, and the released master card is circulated to the stack station 344. Then the operation is repeated with reference to the new master card.

In the logic control system of FIGURE 8, the card 400 represents a master card from the feed station 320 and the card 402 represents an index card from the feed station 332. The transducer 326 of FIGURE 7 is represented in FIGURE 8 by a plurality of transducer heads 326a, 326b, 326c and 326d. Each of these heads scans a different row of binary data on the master card. As in the previous embodiments, it is clear that when more complex binary numbers for identifying the document numbers are used requiring more rows of binary bits, more transducer heads will be required.

The transducer head 326 scans a lower row which in the illustrated embodiment contains clock recordings and provides clock pulses for timing the card being scanned. Each of the rows of binary data is arranged so that the binary bits in the adjacent rows appear as columns extending across the card, each column representing a different position of the card. Each of these columns is represented by a clock bit in the lower row, and each column represents a multi-digit binary number. As noted above, it will be assumed that the document number for any card will be represented by the binary number recorded at a chosen position of the card. The control system of FIGURE 7 is adjusted so that only the binary number at any particular position is utilized by the control system to automatically merge-collate the master and index cards.

The transducer 334 of FIGURE 7 is represented in FIGURE 8 by the transducer heads 334a, 334b, 334c and 334d. The arrangement of the magnetic data on the index cards 402 may be similar to that on the master card. In this instance, the transducer head 334d scans the clock row, and the transducer heads 334a, 334b and 334c scan the rows corresponding to the binary data on the cards. As in the case of the master cards, the binary number at a particular chosen position on the index cards represents the document number, and the control system of FIGURE 8 is adjusted so that the number at that position only is utilized by the control circuitry.

The transducer heads 326a, 326b, 326c and 326d are connected to respective amplifiers 404, 406, 408 and 410. The amplifiers 404, 406 and 408 are respectively connected to the left input terminals of respective flip-flops 412, 414 and 416 and to the input terminals of associated inverter networks 418, 420 and 422. Each of the inverter networks is connected to the right input terminals of its corresponding flip-flop.

The inverter networks may be simple vacuum tube amplifiers, or the like, which serve to invert the polarity of the signals passed through them. One purpose of these inverters is to provide for the triggering of the flip-flops to a true state in response to a negative going pulse. Upon translation by the inverter, this pulse has no effect on the right input terminal of the flip-flops because it then has a wrong polarity for triggering purposes. Another purpose is to provide for the triggering of each flip-flop to a false state upon the passage of a positive going pulse from the corresponding amplifier. This pulse has the wrong polarity to trigger the flip-flop to a true state but, upon inversion by the inverter, has a proper polarity to trigger the flip-flop to a false state. Therefore, when a transducer head 334a, 334b or 334c scans a magnetic area of one polarity, its associated flip-flop 412, 414 or 416 is triggered to a true state; and, when the particular transducer head scans a magnetic area of the other polarity, its associated flip-flop is triggered to a false state.

The amplifier 410 feeds its output signal to the left input terminal of a flip-flop 424 and to the input terminal of a delay line 426. The output terminal of the delay line 426 connects with the right input terminal of the flip-flop 424. The flip-flop 424 is triggered to a false state by each clock pulse produced by the amplifier 410 in response to the scanning of a clock recording in the lower row of a master card by the transducer head 326d. The delay line 426 delays the triggering pulse long enough so that the flip-flop 424 is returned to a true state before the next clock recording is scanned by the transducer head 326d. Therefore, a series of pulses appears at the left output terminal of the flip-flop 424 corresponding to the clock pulses developed by the amplifier 410.

The pulses from the left output terminal of the flip-flop 424 are introduced to a binary counter 428. This binary counter produces a different pattern of output signals for each different count of the clock pulses as each master card is scanned. A selector network 430 is connected to the binary counter, and this selector is set to a particular chosen setting. The selector passes output signals to all the input terminals of an "and" network 432 when the pattern of output signals from the binary counter 418 corresponds to the pattern set up in the selector. This occurs in correspondence with the scanning of the desired position on the card and the "and" network 432 passes a signal to its output terminal when the desired position is so scanned. The selector is set so that the "and" network 432 will produce an output signal when the scanned position of each master card corresponds to the position at which the document number is recorded. The illustrated arrangement of the binary counter 428 and the selector 430 and the "and" network 432 is more fully described in copending application Serial No. 566,505, filed February 20, 1956, in the name of Jerome B. Wiener.

The output signal from the "and" network 432 is applied to one input terminal of each of a series of "and" networks 434, 436, 438, 440, 442 and 444. The left and right output terminals of the flip-flop 412 are connected respectively to the "and" networks 434 and 436. The left and right output terminals of the flip-flop 414 are connected respectively to the "and" networks 438 and 440. Also, the left and right output terminals of the flip-flop 416 are connected respectively to the "and" networks 442 and 444.

The "and" networks 434 and 436 in turn are connected respectively to the left and right input terminals of a flip-flop 446. The output terminals of the "and" networks 438 and 440 are connected respectively to the left and right input terminals of a flip-flop 448. Also, the output terminals of the "and" networks 442 and 444 are connected respectively to the left and right input terminals of a flip-flop 450.

The flip-flops 412, 414 and 416 constitute a register, and these flip-flops respond to the parallel read-out of binary data on the master cards to receive the binary numbers recorded on each card as the card is processed from one position to the next. However, the "and" networks 434, 436, 438, 440, 442 and 444 are conditions for translation by the elements 428, 430 and 432 only when the position on each master card which bears the binary data corresponding to the document number is being read. Therefore, only the binary number corresponding to the document number is stored in the flip-flops 446, 448 and 450. That is, this latter group of flip-flops forms a register into which is inserted the binary number corresponding to the document number of each master card scanned by the transducer 326.

As noted above, in the more complex systems, the document number would be represented by a multi-digit binary number having more than three digits. For such applications, the number of flip-flops and "and" networks in the registers would have to be increased accordingly.

The transducers 334a, 334b, 334c and 334d are connected to circuitry and components similar to those described above in conjunction with the transducer heads 326a, 326b, 326c and 326d. The transducer heads 334a, 334b, 334c and 334d are connected to a plurality of respective amplifiers 452, 454, 456 and 458. The amplifier 452 is connected to the left input terminal of a flip-flop 460 and to an inverter 462, the output terminal of the inverter being connected to the right input terminal of the flip-flop. The amplifier 454 is connected to the left input terminal of a flip-flop 464 and to the input terminal of an inverter network 466, the inverter 466 being connected to the right input terminal of the flip-flop. The amplifier 456 is connected to the left input terminal of a flip-flop 468 and to an inverter 470, the output terminal of the latter inverter being connected to the right input terminal of the flip-flop 468.

The amplifier 458 is connected to the left input terminal of a flip-flop 472 and to the input terminal of a delay line 474. The output terminal of the delay line is connected to the right input terminal of the flip-flop 472. The left output terminal of the flip-flop 472 is connected to a binary counter 476, and the binary counter is connected to a selector 478 which in turn is connected to an "and" network 480.

The "and" network 480 has an output terminal which is connected to each of a plurality of "and" networks 482, 484, 486, 488, 490 and 492. The left and right output terminals of the flip-flop 460 are connected respectively to the "and" networks 482 and 484. The left and right output terminals of the flip-flop 464 are connected respectively to the "and" networks 486 and 488.

The left and right output terminals of the flip-flop 468 are connected respectively to the "and" networks 490 and 492. The "and" networks 482 and 484 are connected respectively to the left and right input terminals of a flip-flop 494. The "and" networks 486 and 488 are connected respectively to the left and right input terminals of a flip-flop 496. The "and" networks 490 and 492 are connected respectively to the left and right input terminals of a flip-flop 498.

As in the portion of the control system associated with the master card 400, the flip-flops 460, 464 and 468 form a register which stores each binary number at each position of the index card 402, as the index card is processed by the transducer heads 334a, 334b, 334c and 334d from one position to the next. The flip-flops 494, 496 and 498, however, store only the binary number corresponding to the document number of the particular index card.

The flip-flops 446, 448 and 450 have their output terminals connected to one set of input terminals of a comparator 500, and the flip-flops 494, 496 and 498 have their output terminals connected to another set of input terminals of the comparator. The comparator is shown in block form for purposes of simplicity. This network is formed from a plurality of "and" and "or" networks which are interrelated in a logical pattern. The comparator is so constructed that it develops an output pulse at an output terminal 502 when the binary number stored in the registers 446, 448 and 450 is equal to the binary number stored in the registers 494, 496 and 498. Conversely, the comparator develops a pulse at its output terminal 504 when these binary numbers are unequal. A further discussion of a comparator similar to the comparator 500 will be found in copending application Serial No. 566,404 which was filed February 20, 1956, in the name of Jerome B. Wiener.

The control system of FIGURE 8 includes a source of direct voltage 506. This source has a positive terminal, a negative terminal and a grounded common terminal. The positive terminal of the source 506 is connected to a push-button type of start switch 508. This switch is connected to a capacitor 510 which, in turn, is connected to a differentiator 512. The output terminal of the differentiator 512 is connected to the left input terminal of a flip-flop 514 and to the input terminal of a delay line 516. The output terminal of the delay line is connected to the right input terminal of the flip-flop 514.

The left output terminal of the flip-flop 514 is connected to the control grid of a triode 518 and to the control grid of a triode 520. A resistor 522 is connected to the control grid of the triode 518 and to the negative terminal of the source 506 to hold the triode 518 non-conductive so long as the flip-flop 514 is in a false state. Likewise, a resistor 524 is connected to the control grid of the triode 520 and to the negative terminal of the source 506 to hold the triode 520 non-conductive so long as the flip-flop 514 is in a false state.

The cathode of the triode 518 is grounded, and the anode is connected to one terminal of a winding associated with the solenoid 324. The other terminal of this winding is connected to the positive terminal of the source 506. Likewise, the cathode of the triode 520 is grounded, and the anode of the latter triode is connected to the winding associated with the solenoid valve 342. The other terminal of this latter winding is also connected to the positive terminal of the source 506.

The output terminal 502 of the comparator 500 is connected to the left input terminal of the flip-flop 526 and to a delay line 528. The output terminal of the delay line 528 is connected to the right input terminal of the flip-flop 526. The left output terminal of the flip-flop 526 is connected to the control grid of a triode 530. A resistor 532 is connected to the control grid of the triode 530 and to the negative terminal of the source 506 to hold the triode 530 non-conductive as long as the flip-flop 526 is in a false state. The anode of the triode 530 is connected to the winding associated with the solenoid 338 of the hold station 336. The other terminal of this winding is connected to the anode of the triode 520.

The output terminal 504 of the comparator 500 is connected to the left input terminal of a flip-flop 534 and to a delay line 536. The output terminal of the delay line 536 is connected to the right input terminal of the flip-flop 534. The left output terminal of the flip-flop 534 is connected to the control grid of a triode 538. This triode has a grounded cathode, and its control grid is connected to a resistor 540. The resistor 540 is connected, in turn, to the negative terminal of the source 506, and the resistor serves to hold the triode 538 non-conductive so long as the flip-flop 534 is in a false state. The anode of the triode 538 is connected to the winding of the solenoid valve 330 associated with the hold station 328. The other terminal of this latter winding is connected to the anode of the triode 518.

To start the system, the push-button switch 508 is closed and released. This causes a charging current to flow into the capacitor 510 which, in turn, causes the differentiator 512 to produce a sharp output triggering pulse. The triggering pulse from the differentiator 512 causes the flip-flop 514 to be triggered to a true state for a time determined by the time delay of the delay line 516. The flip-flop 514 is so triggered to a true state for an interval long enough to release the first master card from the feed station 320 and to release the first index card from the feed station 332. This release of the first master card and of the first index card is caused by the conductivity of the triodes 518 and 520 which, in turn, cause currents to flow through the windings of the solenoid valves 324 and 342. This current flow in the solenoid windings causes the valves 324 and 342 to close, and thereby to interrupt the vacuum pressure at the feed heads 322 and 340. As noted, the delay of the delay line 516 is such that the interruption in vacuum pressure is of such a time interval that one card only is released from each of the feed stations 320 and 332.

The master card released from the station 320 is held at the hold station 328 after being processed by the transducer 326. Likewise, the index card released from the feed station 332 is held at the hold station 336 after its data has been processed by the transducer 334.

It is clear that the document numbers represented at the selected position of the master card now held at the hold station 328 and the index card now held at the hold station 336 will be the same when it is assumed that each master card has at least one index card. It should be pointed out, however, that any master cards that do not have an associated index card will not interfere with the proper operation of the system. Instead, the master card will be stacked in its proper position in the stack station 344 without any associated index cards.

Assuming then an equality between the document numbers of the first master card held at the hold station 328 and the index card held at the hold station 336, the comparator 500 will develop an output pulse at its output terminal 502. This output pulse will trigger the flip-flop 526 to a true state long enough to cause the resulting current flow through the windings of the solenoid valves 324 and 338. Closure of these valves in turn causes the index card held by the hold station 336 to be released and a second index card to be released from the feed station 332. The flip-flop 526 is then returned to its false state by the output pulse from the delay line 528.

The index card released from the hold station 336 is then circulated to the stack station 344, and the following index card is held at the hold station. This following index card is also processed by the transducer 334, and if its document number is the same as the held master card at the hold station 328, it too is released from the hold station 336 and circulated to the stack station 344. The release of each index card from the hold station 336 is accompanied by the transfer of the following index card from the feed station 332 to the hold station 336. This action continues as long as the document numbers on the index cards are the same as the document number on the master card at the hold station 328. When an index card is reached whose document number is different from the document number on the master card at the hold station 328, the comparator develops a pulse at its output terminal 504 and this pulse triggers the flip-flop 534 to a true state for a time interval determined by the time delay of the delay line 536.

This triggering of the flip-flop 534 causes the master card to be released from the hold station 328 and stacked in the stack station 344 next to its last index card. The triggering of the flip-flop 534 also produces a current flow through the winding of the solenoid valve 324 to cause a new master card to be released from the feed station 320 and transferred to the hold station 328.

Now, if the held index card at the hold station 336 has the same document number as the presently held master card, the resulting pulse at the output terminal 502 of the comparator 500 will cause the index card to be released from the hold station 336 and another to take its place. Then, index cards will be fed to the stack station 344 so long as they have the same document number as the presently held master card. In this manner, master cards from the feed station 320 and index cards from the feed station 332 are merge-collated into the stack station 344. The cards appearing in the stack station 344 at the end of the process are in appropriate order with each master card being followed by a group of index cards having the same document number.

It is now desired to feed the stack of merged master and index cards from the stack station 344 into suitable equipment which will cause the photographic images on each master card to be transferred onto the photographic area of each of its associated index cards.

Such apparatus is shown in FIGURE 9, and a suitable control system for the apparatus is shown in FIGURE 10. The apparatus of FIGURE 9 is shown in fragmentary form. This apparatus will also include the transport drums 12 and 14 of FIGURE 3, as well as the feed station 18 and stack station 20 in that station and the various gate transfer mechanisms 52, 60, 56 and 58, the feed heads 50 and 62 associated with the stations 18 and 20 respectively, and the transducer 24.

For the present purpose, the master cards and the index cards are placed in their collated-merged condition in the feed station 18, and these cards are fed under the control of the logic of FIGURE 9 past the transducer 24 and onto the low speed drum 16. The transducer 24 is now used as a reading station, and its various transducer heads read the binary data on the master and index cards. The various stations associated with the low speed drum 16 in FIGURE 3 are replaced by a station generally indicated at 509.

In the view of FIGURE 9, the drum 16 is illustrated as being driven by an appropriate drive motor 502. The drive shaft of this motor is connected to a worm gear 504 which, in turn, engages a pinion gear 506. The latter gear is mounted at the lower end of a vertical drive shaft 510. A Geneva drive system 512 couples the drive shaft 510 with the drive shaft 514 of the drum 16. The Geneva drive system includes a driving member 516 which is keyed to the shaft 510. As the shaft 510 is continually rotated by the drive motor 502 at a relatively slow speed, a spin 518 in the driving member 516 engages corresponding slots in the Geneva wheel portion of the Geneva drive 512. This engagement of the pin 518 in the slots causes intermittent motion to be imparted to the drum 16, with each rotational movement of the drum being separated by a dwell interval. This, as explained above, enables a card to be moved to a photographic station and to be held stationary at such a station while the photographic transfer is taking place.

The equipment 509 will be described as being utilized to transfer the photographic images from a master card to each of the associated index cards. However, it will be appreciated that similar photographic equipment may be used in the apparatus of FIGURE 3, as suggested previously, to transfer photographic images from the microfilm to the master cards.

The apparatus 509 includes a housing 520. This housing defines an inner chamber, and it has a top 522 and it has a bottom 524. It also has a pair of side walls 526 and 528. The top, bottom and side walls may have an integral construction when so desired. A pair of guide rails 530 and 532 are mounted on the table top 11 in spaced parallel positions. These guide rails have channels formed in them which correspond in width to the overall height of the housing 520. The housing is fitted between the guide rails 530 and 532 and is adapted to move back and forth on the table top 11 between these guide rails. The inner chamber of the housing is provided with a mouth portion having a generally arcuate configuration. The assembly is so positioned that when the housing is moved forward between the guide rails 530 and 532, its mouth portion is brought into close proximity with the periphery of the drum 16. The width of the mouth portion is made to correspond to the length of one of the master or index cards.

A slot 534 is formed in the table top 11, and a pin 536 extends downwardly through the slot. The pin 536 also extends through a slot 538 which is formed at one end of a crank arm 540. The other end of the crank arm 540 is pivoted to a disk 542 which, in turn, is mounted at one end of the shaft 510.

The shaft 510 rotates one revolution for each intermittent movement of the drum 16. For each revolution that the shaft 510 undergoes, the disk 542 moves the crank arm 540 in a rectilinear manner which, in turn, moves the mouth of the chamber of the housing 520 to and from the peripheral surface of the drum 16. Therefore, for each angular movement of the drum 16, the mouth of the chamber in the housing 520 is brought to the periphery of the drum and is then retracted back from the periphery.

A slot is formed through the top 522 of the housing 520, and an aligned groove is formed in the inner surface of its bottom 524. A movable shutter 544 of rectangular configuration is disposed in the slot in the top of the housing 520 and extends into the groove in the bottom 524. This shutter normally is held by gravity in its down position to enclose the chamber in the housing 520 and to cut off the interior of the chamber from its mouth portion.

A solenoid 546 is mounted on the top 522 by means of an appropriate external bracket 548. The armature of the solenoid is connected to the shutter 544. When the solenoid is energized, its armature is retracted upwardly which causes the shutter to open. When the solenoid is de-energized, the shutter immediately falls to its closed position.

A vacuum pressure is introduced to the interior of the chamber by means, for example, of a feed line 550 which connects the chamber to a solenoid valve 552. A second appropriate feed line is coupled at one end to the valve 552 and at the other end to a suitable vacuum pressure source. A positive pressure can also be established in the chamber 520 by means of a feed line 554 which couples a solenoid valve 556 to the interior of the chamber. The solenoid valve 556 is coupled to a suitable feed line which couples that valve to an appropriate source of pressurized air or other fluid. As illustrated, both the feed lines 550 and 554 extend through the top wall 522 to the interior of the chamber 520. Suitable channels are provided which by-pass the shutter 544 and which enable the vacuum pressure or positive pressure established in the housing 520 to be communicated to the mouth of its internal chamber, even when the shutter is closed.

A switch actuator 560 is mounted on the shaft 510. The actuator 560 has a microswitch 564 associated with it, and this microswitch is actuated at the beginning of each dwell interval of the drum 16 and when the mouth of the chamber of the housing 520 is at its closest point of proximity with the periphery of the drum 16.

When a master card is transferred to the drum 16, the card is intermittently moved with the drum to the station 509. When the card reaches the station 509, and under control of the system of FIGURE 10, the mouth of the chamber 520 is moved to the periphery of the drum 16 and the solenoid valve 552 is energized to create a vacuum pressure in the chamber. This causes the master card to be withdrawn from the periphery of the drum 16 and to be arrested across the mouth of the chamber of the housing 520. The vacuum pressure is maintained so that the master card is held across the mouth of the chamber.

Now, when one of the index cards associated with the master card is transported to the station 509, the master card is moved down into intimate contact with the index card. The station includes a lamp 570 which projects its rays for exposing purposes 572 into the chamber 520. At the appropriate time, the solenoid 546 is energized to open the shutter 544 and thereby expose the photographic emulsion on the index card to the documentary images on the master card. This exposure takes place at the precise instant the master card is moved into close contact with the index card by movement of the crank arm 540 by the disk 542. The solenoid valve 556 can be energized at this time to pass pressurized fluid to the chamber, and thereby cause the master card to be forced into intimate contact with the index card.

Known photographic techniques may be used, so that the developing of the resulting photographic images on the index cards may occur together with the exposing process. This enables developed photographic images to be produced on the index cards at the station 509. The particular index card is then moved away from the station 509 and replaced by the next index card. The process is repeated for each index card exhibiting the same document number as the master card at the station 509.

When all the corresponding index cards have been so processed, the master card is released from the mouth of the housing 520 by replacing the vacuum pressure in the chamber with pressurized fluid from the solenoid 556. This pressurized fluid blows the master card back to the periphery of the drum 16. The master card is then returned to the drums 14 and 12, and it is stacked in the station 20. The next master card is then selected and the process is repeated for it.

In the logical control system of FIGURE 10, the transducer 24 is represented by the transducer heads 24a, 24b, 24c and 24d. As noted above, these transducer heads serve to read the magnetic data on the master cards 400 and on the index cards 402 as such cards are transported on the drum 14 past these heads.

The transducer 24d will be assumed to process the clock row on the cards, and this head is connected to an amplifier 600. The amplifier 600 applies its signal to the left input terminal of a flip-flop 602 and to a delay line 604. The output terminal of the delay line is connected to the right input terminal of the flip-flop. The flip-flop 602, like the flip-flop 472 of FIGURE 8, produces clock pulses as each card is scanned. The flip-flop 602 has its left output terminal connected to a binary counter 606 which, in turn, has output terminals connected to a selector 608, the selector being connected to an "and" network 610. The binary counter 606, the selector 608 and the "and" network 610 function in the same manner as the corresponding elements 476, 478 and 480 in the system of FIGURE 8 to cause the "and" network 610 to produce an output pulse when a selected column of binary data on the cards is being processed. As noted above, this column will contain binary data corresponding to the document numbers of the master and index cards.

The heads 24a, 24b and 24c will scan the rows corresponding to the binary data on the cards. As noted previously, in most systems the document numbers will be represented by multi-digit binary numbers having more than three digits, so that more heads will be used and more rows of binary data will appear on each card. For purposes of the present explanation, the heads 24a and 24b only will be considered. As noted, duplicate circuitry may be provided for any other activated heads.

The transducer heads 24a and 24b are respectively connected to respective amplifiers 612 and 614. The amplifier 612 is connected to the left input terminal of a flip-flop 616 and to an inverter 618, the output terminal of the inverter being connected to the right input terminal of the flip-flop 616. The amplifier 614, on the other hand, is connected to the left input terminal of a flip-flop 620 and to the input terminal of an inverter network 622. The output terminal of the inverter 622 is connected to the right input terminal of the flip-flop 620.

As in the previous embodiment, the flip-flops 616 and 620 form a register, and each binary number scanned on the cards 400 or 402 by the transducer 24 is transferred into the register.

The output terminal of the "and" network 610 is connected to each of a plurality of "and" networks 624, 626, 628 and 630. The output terminals of the flip-flop 616 are connected respectively to the "and" networks 624 and 626. The output terminals of the flip-flop 620 are connected respectively to the "and" networks 628 and 630.

The "and" networks 624, 626, 628 and 630 are respectively connected to a plurality of "and" networks 632, 634, 636 and 638, and the "and" networks 624, 626, 628 and 630 are also respectively connected to a plurality of "and" networks 640, 642, 644 and 646. A flip-flop 648 has its right output terminal connected to an input terminal of each of the "and" networks 632, 634, 636 and 638, and this flip-flop has its left output terminal connected to an input terminal of each of the "and" networks 640, 642, 644 and 646.

The "and" networks 632 and 634 are respectively connected to the left and right input terminals of a flip-flop 649. The "and" networks 636 and 638, on the other hand, are respectively connected to the left and right input terminals of a flip-flop 650. The "and" networks 640 and 642 are connected respectively to the left and right input terminals of a flip-flop 652. The "and" networks 644 and 646 are respectively connected to the left and right input terminals of a flip-flop 654.

The flip-flops 649 and 650 have their left and right output terminals connected to one group of input terminals of a comparator 656, and the flip-flops 652 and 654 have their left and right output terminals connected to a second group of input terminals of this comparator. The comparator 656 may be similar in its construction to the comparator 500 of the control system of FIGURE 8. The comparator 656 develops an output pulse at its output terminal 658 when the binary number stored in the register made up by the flip-flops 649 and 650 equals the binary number stored in the register made up by the flip-flops 652 and 654. Conversely, the comparator develops a pulse at its output terminal 660 when these binary numbers are not equal.

The logic control system of FIGURE 10 includes a start switch 662 of the push-button type. The fixed contact of the switch 662 is connected to the positive terminal of the source of direct voltage 220, and the armature of the switch connects with a capacitor 664. The capacitor 664 is connected to a differentiator 666, and the differentiator is connected to an "or" network 668, to a delay line 670, to a delay line 672, to a delay line 674, to a delay line 676, to an "or" network 678 and to a delay line 680.

The "or" network 668 is connected to the left input terminal of the flip-floap 230 associated with the control circuit for the feed station 18. The delay line 670 is connected to an input terminal of the "or" network 668. The delay lines 672 and 674 are connected to different input terminals of an "or" network 682 which, in turn, is connected to the left input terminal of the flip-flop 238 in the control circuit of the gate transfer mechanism 52. The delay line 676 connects with an "or" network 584, and the "or" network introduces its output signal to the left input terminal of the flip-flop 250 in the control circuit of the gate transfer mechanism 56.

The "or" network 678 is connected to the right input terminal of the flip-flop 648. The delay line 680 has its output terminal connected to an input terminal of an "or" network 686. The "or" network 686 supplies its output signal to the left input terminal of the flip-flop 548.

The output terminal 658 of the comparator 656 is connected to a delay line 688, to a delay line 790, to a delay line 692, to a delay line 698, to a delay line 700, and to a delay line 702.

The delay line 688 is connected to an input terminal of the "or" network 668. The delay line 690 is connected to an input terminal of the "or" network 682. The delay line 692 has its output terminal connected to an input terminal of the "or" network 684, the delay line 694 also being connected to that "or" network. The delay line 698 is connected to the left input terminal of a flip-flop 704. A delay line 705 is connected between the left and right input terminals of the flip-flop 704. The delay line 700 is connected to an "or" network 706 which, in turn, is connected to the left input terminal of the flip-flop 278 in the control circuit of the gate 58. The delay line 702 is connected to an "or" network 708, and the "or" network 708 is connected to the left input terminal of the flip-flop 288 in the control circuit of the gate 60.

The left output terminal of the flip-flop 704 is connected to an "and" network 710. The switch 564 of FIGURE 9 has its armature grounded, and the fixed contact of the switch is connected to a single shot multivibrator 712. This multivibrator, like the multivibrator 264 of FIGURE 5, produces an output pulse each time the switch is closed. The output terminal of the single-shot multivibrator is connected to a second input terminal of the "and" network 710. The "and" network 710 connects with the left input terminal of a flip-flop 714 and to the input terminal of a delay line 716. The output terminal of the delay line 716 is connected to the right input terminal of the flip-flop 714.

The left output terminal of the flip-flop 714 is connected to the control grid of a triode 716. The cathode of the triode is grounded, and a resistor 718 is connected between its control grid and the negative terminal of the source of direct voltage 220. The anode of the triode 716 is connected to the energizing winding of the solenoid 546 of FIGURE 9 which controls the shutter 544. The other terminal of this winding is connected to the positive terminal of the source of direct voltage 220. Whenever the flip-flop 714 is triggered to a true state, the triode 716 becomes conductive. This causes a current flow through the winding of the solenoid 546 which opens the shutter 544.

The output terminal 660 of the comparator 656 is connected to a delay line 720, to a delay line 722, to a delay line 724, and an "or" network 685 which is connected to a delay line 726. The terminal 660 is also connected to the "or" network 678 and to the "or" network 686. The output terminal of the "or" network 684 is also connected to the "or" network 685. The output terminal 660 of the comparator 656 also connects with the left input terminal of a flip-flop 728 and with the input terminal of a delay line 730. The output terminal of the delay line is connected to the right input terminal of the flip-flop 728. The left output terminal of the flip-flop 728 is connected to an "and" network 732. The output terminal of a single-shot multivibrator 713 also controlled by the switch 564 is also connected to the "and" network 732 and to an "and" network 734. The delay line 726 is connected to the left input terminal of a flip-flop 736, and the left output terminal of the flip-flop is connected to the "and" network 734. The output terminal 660 of the comparator 656 is also connected with the right input terminal of the flip-flop 736.

The "and" network 734 is connected to the left input terminal of a flip-flop 738. The output terminal of the "and" network 732 is connected to the right input terminal of the flip-flop 738. The left output terminal of the flip-flop 738 is connected to the control grid of a triode 740. This triode has a grounded cathode, and a resistor 742 is connected from its control grid to the negative terminal of the direct voltage source 220. The anode of the triode 740 is connected to the winding of the solenoid 552 which controls the vacuum pressure to the chamber 520 of the station 509 in FIGURE 9. The other terminal of the winding of the solenoid 552 is connected to the positive terminal of the source 220. Whenever the flip-flop 738 is triggered to a true state, the triode 740 is rendered conductive and a vacuum pressure is established in the chamber of the housing 520.

The "and" network 732 is also connected to the left input terminal of a flip-flop 744 and to the input terminal of a delay line 746. The output terminal of the delay line 746 is connected to the right input terminal of the flip-flop 744. The left output terminal of the flip-flop 744 is connected to the control grid of a triode 748. A resistor 750 is connected to the control grid and to the negative terminal of the source 220. The cathode of the triode 748 is grounded, and the anode of the triode is connected to one terminal of the winding of the solenoid 556 of the apparatus in FIGURE 8. The other terminal of this winding is connected to the positive terminal of the source 220. Whenever the flip-flop 744 is triggered to a true state, the triode 748 is rendered conductive and a positive air pressure is established in the chamber of the housing 520.

The output terminal 660 of the comparator 656 is also connected to a delay line 752 and to a delay line 754. The delay line 752 is connected to the "or" network 706, and the delay line 754 is connected to the "or" network 708.

It will be remembered that the purpose of the control system of FIGURE 10 is to control the cards so that the photographic images on the master cards may be transposed to each of the associated index cards. It will be also remembered that the apparatus for accomplishing this is simalar to that shown in FIGURE 3, with the exception that the stations associated with the drum 16 in FIGURE 3 are replaced by the station 509.

The cards are placed in the feed station 18, and in the described manner, these cards have been previously collated so that each master card is followed by its associated index cards, the index cards in each instance bearing the same document number as their associated master card.

To start the operation, the start switch 662 of FIGURE 10 is depressed and released. This causes a charging current flow into the capacitor 664 due to its connection with the positive terminal of the source 220. This, in turn, causes the differentiator 666 to produce a sharp triggering output pulse.

The output pulse from the differentiator 666 is passed by the "or" network 668 to the left input terminal of the flip-flop 230. This causes the first master card to be released from the feed station 18. The pulse, after an appropriate delay in the delay line 672 is passed through the "or" network 682 to the flip-flop 638. This activates the gate 52 at the proper time to transfer the master from the drum 12 to the drum 14. As the master card is transported on the drum 14 past the transducer 24, the transducer heads 24a, 24b, 24c and 24d read the binary data recorded on the card. The binary number at each position on the card is transferred to the flip-flops 616 and 620 in the described manner, and the elements 606, 608 and 610 are controlled so that the "and" networks 624, 626, 628 and 630 will pass the binary number at the position corresponding to the document number of the master card. The start pulse from the differentiator 666 is passed through the "or" network 678 to the right input terminal of the flip-flop 648. This causes the flip-flop 648 to condition the "and" networks 632, 634, 636 and 638 for conduction so the the binary number corresponding to the document number of the master card is transferred to the register composed of the flip-flops 649 and 650.

The delay line 676 now translates the start pulse to the flip-flop 250 so that the master cards may be transferred from the drum 14 to the drum 16. This pulse is also passed by the "or" network 685 and through the delay line 726 to the flip-flop 736 to trigger that flip-flop to a true state. The triggering of the flip-flop 736 to a true state conditions the "and" network 734 for conduction. The delay line 726 delays the pulse a time interval corresponding to that required to transport the master card from the station 56 to the station 509, on the drum 16. Then, the output pulse from the delay line 726 triggers the flip-flop 736 to a true state. Then, at the start of the following dwell period and when the master card is arrested at the mouth of the station 509, and also at the precise instant that the mouth is brought forward into close proximity with the periphery of the drum 16, the switch 564 closes and the resulting output pulse from the multivibrator 713 is passed by the "and" network 734 to trigger the flip-flop 738 to a true state. This produces a vacuum pressure at the chamber 520 which causes the master card to be removed from the periphery of the drum 16 and held across the mouth of the station 509.

When the master card has been deposited on the mouth of the station 509, the delay line 670 passes the start pulse to the flip-flop 230 to release the second card from the feed station 18. The delay line 674 activates the flip-flop 238 at the proper time to transfer the second card to the drum 14 to enable it to be processed by the transducer 24. At this time, the delay line 680 passes a pulse to the "or" network 686 which in turn causes the flip-flop 648 to be triggered to a true state prior to the processing of the second card by the transducer. This causes the "and" networks 640, 642, 644 and 646 to be rendered conductive instead of the "and" networks 632, 634, 636 and 638. Therefore, the binary number corresponding to the document number of the second card is stored in the register composed of the flip-flops 652 and 654, and the binary number corresponding to the document number of the first master card remains in the register composed of the flip-flops 649 and 652.

If the second card has the same document number as the master card, the comparator 656 will develop an output pulse at its equal output terminal 658. This output pulse will be introduced through the delay line 692 to the "or" network 684 to trigger the flip-flop 250 at the proper time to transfer the second card from the drum 14 to the drum 16. The second card will now be carried to the mouth of the station 509 to the periphery of the drum 16.

When the second card reaches the mouth of the station 509, the delay line 698 will pass the input pulse to the left input terminal of the flip-flop 704 to trigger that flip-flop to a true state. This conditions the "and" network 710 and when the mouth of the station 509 moves forward to bring the master card down against the arrested second card, the switch 564 will close to cause the multivibrator 712 to produce an output pulse. This output pulse is translated through the "and" network 710 to the left input terminal of the flip-flop 714.

The introduction of a pulse to the left input terminal of the flip-flop 714 causes the shutter 544 to be opened to expose the index card through the photographic images on the master card, and it remains open for a time dependent upon the characteristics of the delay line 716. The master card masks the index card from the vacuum pressure in the housing 520 so that there is no tendency for the index card to be drawn from the periphery of the drum 16. This delay line has a delay which is selected to correspond to the desired exposure time. When the exposure is completed and the delay line 716 returns the flip-flop 714 to a false state, the delay line 705 now causes the flip-flop 704 to be returned to its initial false state.

The drum 16 then continues to rotate intermittently to carry the index card away from the station 509 and to bring the index card back to the contiguous point of the drum 16 with the drum 14. At that time, the delay line 700 passes a pulse to the flip-flop 278 so that the gate 58 may be activated to return the index card to the drum 14. It should be noted that the index card now has the required photographic images recorded on it from the master card.

After the index card has been transferred to the drum 14, it is carried to the gate 60. At the appropriate time, the delay line 702 passes a pulse to the flip-flop 288 so that the index card may be returned to the drum 12 due to the activation of the gate 60. The index card is then carried to the stack station 20 and is deposited in that station.

The delay line 688 now passes a pulse to the flip-flop 230 so that another card may be released. Then, the delay line 690 passes a pulse at the proper time to transfer this third card to the drum 14 to enable the third card to be processed by the transducer 24. So long as the subsequent cards have the same document number as the master card held at the station 509, these cards will be processed in the manner described above with each such card being carried to the mouth of the housing 520 at the station 509 to receive a photographic image from the master card.

After all the index cards associated with the master card at the station 509 have been processed, the card released from the feed station 18 will be a master card and will have a different document number than the master card held at the station 509. This will cause a pulse to appear at the output terminal 660 of the comparator 656. This pulse is introduced to the right input terminal of the flip-flop 736 to return that flip-flop to a false state. The pulse is also introduced to the left input terminal of the flip-flop 728 to condition that flip-flop to a true state. Therefore, the "and" network 734 is rendered non-conductive and the "and" network 732 is rendered conductive. The next time that the mouth of the station 509 is moved down against the periphery of the drum 16 causing the switch 564 to close, the output pulse from the multivibrator 264 is passed by the "and" network 732 to the right input terminal of the flip-flop 738 to turn off the vacuum in the chamber of the housing 520 and to the left input terminal of the flip-flop 744 to turn on the air pressure in the chamber. This causes the master card to be released from the station 509 and to be reinserted between a pair of ribs 54 on the periphery of the drum 16.

The released master card is now carried by the drum 16 to the gate 58. At the proper time, the delay line 752 passes a pulse to the flip-flop 278 to activate the gate 60 and cause the released master to be transferred back to the drum 14. Before this occurs, however, the delay line 724 passes a pulse to the flip-flop 250 so that the gate 56 may be activated to transfer the new master to the drum 16. The delay 754 passes a pulse at the proper time to activate the gate 60 and return the first master card to the drum 12 so that it may be deposited in the stack station 20 together with its index cards.

The second master is now transferred to the station 509 and at a selected time the delay line 726 passes a pulse to the flip-flop 736 to return that flip-flop to its true state and render the "and" network 734 conductive. At the proper time then, and when the mouth of the station 509 moves against the periphery of the drum 16, the pulse from the multivibrator 264 is passed by the "and" network 734 to trigger the flip-flop 738 to a true state and turn on the vacuum in the chamber of the housing 520 at the station 509. This causes the second master card to be removed from the periphery of the drum 16 and to be held across the mouth of the station 509.

The binary number corresponding to the document number of the new master card is now stored in the register comprised of the flip-flops 652 and 654. The pulse at the output terminal 660 is also introduced through the "or" network 678 to the right input terminal of the flip-flop 648 to trigger that flip-flop to a true state. Therefore, the document numbers from the succeeding cards will be introduced into the register composed of the flip-flops 648 and 650.

The delay line 720 now passes an output pulse to release a further card from the feed station 18. This further card is transported to the gate 52, and the delay line 722 causes that gate to be activated at the proper time to transfer the card to the drum 14. This card is then processed by the transducer head 24 and the binary number corresponding to its document number is stored in the flip-flops 649 and 650. If this binary number is the same as the number corresponding to the document number of the master card now held at the station 509, the resulting pulse at the output terminal 658 of the comparator 656 will cause the last card to be carried in the described manner and receive a photographic impression from the master card. A subsequent card will then be released from the feed station 18, and the process will be repeated so long as the document numbers of the subsequently released cards match the document number of the master card.

When a third master card is reached having a different document number from the second master card now held at the station 509, a pulse is again produced at the output terminal 660 of the comparator 656. This last pulse causes the second master card to be released from the station 509, and it also causes the third master card to be moved to the station 509 and held at that station. The sequence of operations which cause these results are similar to those described above.

The pulse from the output terminal 660 of the comparator 656 is also passed by the "or" network 686 to trigger the flip-flop 648 to a true state. This is necessary because the document number of the third master is stored in the flip-flops 649 and 650, so that it is essential that the document numbers of the following index cards be stored in the flip-flops 652 and 654. This is so that the document numbers of these index cards may be compared with the document number of the third master card.

In general, each time that a pulse is produced at the output terminal 660 of the comparator 656, indicating a new master card from the feed station 18, the flip-flop 648 is triggered to a new state. This causes the document number of each master card to be stored in either one of the flip-flop pairs 649, 650 or 652, 654; and the document numbers of the corresponding index card to be stored in each instance in the other of these flip-flop pairs.

The operations described above continue from one master card to another until all the cards are deposited in the stack station 20, with each master card in the stack station being followed by its associated index cards, with each index card in each group having photographic images corresponding to the photographic images on its corresponding master card.

It is now usually desirable to separate the master cards out of the common stack, and also to separate the index cards into groups corresponding to the subject matter classification of the different index cards. The magnetic data on the different cards is assumed to bear different numbers at a selected position on each card, which numbers correspond to the different subject matter classifications into which the index cards are to be sorted. For example, at the selected position, each of the master cards may bear the same number to indicate a common master file destination. In like manner and at the same position, which, by the way, is different from the document number position, each index card will bear a number corresponding to its designated subject matter file. The index cards and master cards may then be automatically sorted into different files by the apparatus of FIGURE 10 and by the control system of FIGURE 11. The sorting will be such that each master card is placed in a particular file, and the index cards are sorted into different subject matter files as indicated by the particular number at the selected position of each index card.

The apparatus of FIGURE 11 includes a vacuum pressure transport drum 880 which is mounted on a table top 802 for rotation in the clockwise direction. The drum 800 may be similar in its construction to the transport drum 12 described in detail in conjunction with FIGURE 4. A feed station 804 is positioned on the table top 802 with its mouth adjacent the peripheral surface of the transport durm 800. This feed station may be similar to the feed station 18 of FIGURE 3, and it has a feed head 806 positioned at its mouth. This feed head, like the feed head 50, controls the release of cards from the station 804 to the periphery of the drum 800.

A solenoid valve 810 is positioned in the feed line to the feed head 806. Whenever the solenoid portion of this valve is energized, the valve is closed and the vacuum pressure to the feed head is interrupted. This, in the described manner, permits cards to be controllably fed in a one-by-one sequence from the feed station 804 to the periphery of the drum 800.

A plurality of stack stations 812, 814, 816 and 818 are positioned on the table top 802, and each of these stack stations has its mouth adjacent the periphery of the drum 800. The stack station 812 is intended, for example, to receive the master cards from the feed station 804. In like manner, the stack stations 814, 816 and 818 are adapted to receive different index cards from the feed station 804 as determined by the subject matter classification of the different index cards. It is apparent that more stack stations, like the stack stations 814, 816 and 818, will be provided when there are a greater number of subject matter classifications than the three assumed from the purpose of the present description.

The stack stations 812, 814, 816 and 818 may be constructed to be controllable so that a card carried to the mouth of any one of these stations by the drum 800 may be stacked in the particular station or the card may be carried onto any one of the following stations. Stack stations of this general type are described, for example, in copending applications Serial No. 704,788 filed December 23, 1957, and Serial No. 742,546 filed June 17, 1958, by Alfred M. Nelson et al.

Each of the stack stations, for example, may be provided with a stack head, and these stack heads are designated respectively 820, 822, 824 and 826. Each of these stack heads is positioned at the trailing wall of its associated station, and the corresponding stack head extends from the edge of the trailing wall to a position adjacent to the periphery of the drum 800. However, the stack heads are spaced from the periphery of the drum by a distance sufficient to enable a card to be carried past them by the drum unless some other control effect is provided.

The other control effect is produced, for example, by a plurality of blower members 828, 830, 832 and 834. These blowers may each have a construction similar to the unit illustrated in FIGURE 5. The blower members have respective solenoid valves 836, 838, 840 and 842 disposed in their respective feed lines. When any of these valves is energized, pressurized fluid (such as air) is passed to the corresponding blower member. This causes the corresponding blower member to emit streams of pressurized fluid in a tangential direction with respect to the periphery of the drum 800.

When a card transported on the periphery of the drum 800 comes under the influence of a stream of pressurized fluid from one of the blowers 836, 838, 840 or 842, the leading edge of that card is stripped from the drum and moved outwardly from the drum periphery so that it rides up over the associated one of the stack heads 820, 822, 824 or 826. Therefore, when a card is brought to the mouth of one of the stack stations, that card may be deposited in the stack station by activating the associated blower at the proper time. If the blower is not activated, the card is carried under the station and on to the next station.

Stationary pick-off members 844, 846, 848 and 850 are provided at the leading walls of respective ones of the stack stations 812, 814, 816, and 818. These pick-off members, like the pick-off member described earlier in this application, cause each arrested card at the various stack stations to be so arrested with its trailing edge extending over the corresponding pick-off member. Then, the next card is able to ride upwardly over the pick-off member and under the preceding card. If the next card is arrested at the particular station, the preceding card is deposited by it into the station. On the other hand, if the blower associated with that station is not activated, the following card passes under the arrested card and on to the next station.

The master and index cards from the stack station 20 of FIGURE 3 are placed in the feed station 804 of FIGURE 11 upon the completion of the processing of these cards in accordance with the apparatus of FIGURE 8. The stack of cards in this latter feed station will consist of a plurality of master cards, with each master card being followed by its associated index cards and with the associated index cards bearing the same documentary images as the master card. The apparatus of FIGURE 10 causes these cards to be fed from the feed station 804 to the periphery of the drum 800. The master cards have certain similar identifying information at a selected position on each card, as noted, and the logic control system of FIGURE 12 responds to this information to activate the blower 828 of the master card stack station 812 at the proper time so that all of the master cards may be deposited in the stack station 812. Likewise, each index card has certain identifying data corresponding to its subject matter classification at the selected position on each card. The control system of FIGURE 11 responds to the information at that position to deposit the index cards in selected ones of the stack stations 814, 816 and 818 as determined by their subject matter classification.

A transducer 852 is positioned on the table top 802 with its face adjacent the periphery of the drum 800. This transducer is placed between the feed station 804 and the stack station 812. Therefore, each card fed from the feed station 804 to the periphery of the drum 800 is read by the transducer 852. This transducer is represented by a plurality of transducer heads 852a, 852b, 852c and 852d in FIGURE 11. As before, as many transducer heads as are required to scan the different rows of magnetic information on the cards will be provided. By way of example, and to simplify the description, the control system of FIGURE 12 is shown as using the transducer head 852d to scan the clock row on each card, and as using only the two additional transducer heads 852a and 852b to scan two different data rows. As in the previous instances, the heads 852a and 852b will produce a different binary number for each position of the card being scanned.

The transducer heads 852a and 852b are connected to respective amplifiers 900 and 902. The transducer head 852d, on the other hand, is connected to an amplifier 904. The amplifiers 900 and 902 are respectively connected to the left input terminals of a pair of flip-flops 906 and 908. An inverter 910 is connected between the left input terminal of the flip-flop 906 and its right input terminal. Likewise, an inverter 912 is connected between the left input terminal of the flip-flop 908 and the right input terminal of that flip-flop. The amplifier 904 is connected to the left input terminal of a flip-flop 914 and to the input terminal of a delay line 916. The output terminal of the delay line connects with the right input terminal of the flip-flop 914.

The left and right output terminals of the flip-flop 906 are respectively connected to a pair of "and" networks 918 and 920. The left and right output terminals of the flip-flop 908 are connected respectively to a pair of "and" networks 922 and 924.

The left output terminal of the flip-flop 914 is connected to a binary counter 926. The binary counter is connected to a selector 928 which, in turn, is connected to an "and" network 930. The output terminal of the "and" network 930 is connected to a further input terminal of each of the "and" networks 918, 920, 922 and 924. The arrangement of the binary counter 926, the selector 928 and the "and" network 930 may be similar to the components 606, 608 and 610 of FIGURE 9. As in the previous control system, the flip-flop 914 develops clock pulses corresponding to each position on the card being processed, as the different positions are read by the transducer heads 852a, 852b and 852c. The selector 928 is given a particular selected setting, so that the "and" network 930 will pass a signal and cause the "and" networks 918, 920, 922 and 924 to be conductive for a particular position only of each card as it is processed.

The "and" networks 918 and 920 are connected to the left and right input terminals respectively of a flip-flop 932. The "and" networks 922 and 924 are connected respectively to the left input terminals of a flip-flop 934.

As in the previously described system, the flip-flops 906 and 908 will receive each binary number of the card being processed as the card is scanned by the transducer from position to position. The flip-flops 932 and 934, on the other hand, will receive only the binary number at a selected position on each card. In the apparatus under discussion, this selected position will correspond to the position which carries the binary number identifying either the master cards, or identifying the different subject matter classifications of the index cards.

The output terminals of the flip-flops 932 and 934 are individually connected to each of a plurality of comparator networks 936, 938, 940 and 942 The comparator networks have a corresponding plurality of static registers 944, 946, 948 and 950 respectively connected to them. The static registers may have any known construction and may, for example, be of the patch board type. These registers are capable of being manually or otherwise adjusted so that they produce output signals corresponding in each instance to a selected binary number.

In the illustrated embodiment, for example, the static register 944 will be set to produce the binary number corresponding to the binary number indicating a master card. In like manner, the static registers 946, 948 and 950 will be set to produce output signals corresponding respectively to the binary numbers indicating the different subject matter classifications of the index cards.

Each of the comparators will develop an output pulse when the setting of the flip-flops 932 and 934 corresponds to the binary number set up in its associated static register The output terminals of the comparators are connected to respective ones of a plurality of delay lines 952, 954, 956 and 958. These delay lines serve to delay the output pulses from the different comparators for a time corresponding to the time required for the card being processed to reach the mouth of the stack station which is to be activated to receive that card.

The delay line 952 is connected to the left input terminal of a flip-flop 960 and to the input terminal of a delay line 962 The output terminal of the delay line 962 is connected to the right input terminal of the flip-flop 960.

The left output terminal of the flip-flop 960 is connected to the control grid of a triode 964 The control grid is connected to one terminal of a resistor 966. The other terminal of this resistor is connected to the negative terminal of a source of direct voltage 968. The cathode of the triode 964 is grounded, and the anode of this triode is connected to the energizing winding of the solenoid valve 836 which controls the air pressure to the blower 828 at the master card stack station 812. The other terminal of this winding is connected to the positive terminal of the source of direct voltage 968. This source has a grounded common terminal.

The delay line 954 is connected to the left input terminal of a flip-flop 968. This flip-flop has a delay line 970 connected between its left input terminal and its right input terminal. The left output terminal of the flip-flop 968 is connected to the control grid of a triode 972. The cathode of the triode 972 is grounded, and its control grid is connected to a resistor 974. The resistor is connected to the negative terminal of the source 968. The energizing winding of the solenoid 838 which controls the blower 830 at the index card stack station 814 is connected to the anode of the triode 972, and this winding is also connected to the positive terminal of the source of direct voltage 968.

The delay line 956 is connected to the left input terminal of a flip-flop 976 and to the input terminal of a delay line 978. The output terminal of the delay line is connected to the right input terminal of the flip-flop 976. The left output terminal of the flip-flop 976 is connected to the control grid of a triode 980. This control grid is connected to a resistor 982, and the cathode of the triode 980 is grounded. The other terminal of the resistor 982 is connected to the negative terminal of the source of direct voltage 968. The anode of the triode 980 is connected to the energizing winding of the solenoid valve 840 associated with the blower 832 at the index card stack station 816. The other terminal of this winding is connected to the positive terminal of the source of direct voltage 968.

The delay line 958 is connected to the left input terminal of a flip-flop 984 and to the input terminal of a delay line 986. The output terminal of the delay line 986 is connected to the right input terminal of the flip-flop 984. The left output terminal of the flip-flop 984 is connected to the control grid of a triode 988. A resistor 990 is connected to the control grid of the triode 988 and to the negative terminal of the source 968. The cathode of the triode 988 is grounded, and the anode of the triode is connected to the winding associated with the solenoid valve 842 which controls the blower 834 at the stack station 818. The other terminal of this winding is connected to the positive terminal of the source 968.

The output terminals of the comparators 936, 938, 940 and 942 are connected to different input terminals of an "or" network 992. This "or" network is connected to the left input terminal of a flip-flop 993, and a delay line 994 is connected from the left input terminal to the right input terminal of that flip-flop. The left output terminal of the flip-flop 993 is connected to the control grid of a triode 991. The cathode of the triode is grounded, and the control grid is connected to a resistor 995. This resistor is connected to the negative terminal of the source 968. The cathode of the triode 991 is grounded, and the anode of the triode is connected to one terminal of the winding associated with the solenoid valve 810 which controls the feed head 806 at the feed station 804.

The positive terminal of the source 968 is connected to a push-button switch 996, and this switch is connected to a capacitor 997. The capacitor connects with a differentiator 999 which, in turn, is connected to another input terminal of the "or" network 992.

As noted above, the stack of master cards and associated index cards is placed in the feed station 804 of FIGURE 11. The switch 906 of the control system 911 is then depressed and released. This causes a charging current to flow into the capacitor 997 which, in turn, causes the differentiator 999 to produce a sharp triggering pulse. This triggering pulse from the differentiator 999 triggers the flip-flop 993 to its true state, and the delay line 994 enables the flip-flop to remain in its true state long enough to feed the first card from the feed station 804.

The released card is read by the transducer heads 852a, 852b, 852c and 852d and, in the manner described, the identifying number of that card is placed in the register composed of the flip-flops 932 and 934. The number stored in the register is introduced to each of the comparators 936, 938, 940 and 942. Assuming that the first card is a master card, only the comparator 936 will develop an output pulse. After the appropriate delay, this pulse will trigger the flip-flop 960 to its true state. This will occur just as the released card comes under the mouth of the master station. The triggering of the flip-flop 960 to its true state causes the blower 828 at the master station to be activated so that the card is transferred into the master card stack station 812.

The ouput pulse from the comparator 936 also triggers the flip-flop 993 to a true state so that a second card is released from the feed station 804. This is a general happening, and whenever a released card is processed so that any one of the comparators 936, 938, 940 and 942 develops an output pulse, this pulse is introduced to the flip-flop 993 to release a subsequent card from the feed station.

Following the master card, each of the released index cards causes different ones of the comparators 938, 940 and 942 to develop output pulses. These output pulses, in turn, trigger the flip-flops 968, 976 and 984 at the proper times to activate the blowers 830, 832 or 834 at the different subject matter stack stations so that the index cards may be deposited in the proper stack stations as determined by their subject matter classification. This action continues until all the cards in the feed station 804 have been processed and sorted into the different stack stations.

The cards may then be placed in a general storage system of the type illustrated, for example, in FIGURE 13. This storage system may be similar to the systems described and claimed in copending application 587,055 which was filed May 24, 1956, in the name of Allen P. Algier et al., and in copending application 645,640 filed March 12, 1957, in the name of Robert M. Hayes et al. This storage system includes a movable rack 1000 which stores the different stacks of index cards in accordance with their different subject matter classifications. In a manner fully described in the copending applications, the member 1000 is movable up and down or to the right or to the left in a cabinet 1002 to bring a stack of cards corresponding to any desired subject matter classification into alignment with an input feed station 1004 which is mounted on a table top 1006. A plurality of transport drums 1008, 1010, 1012 and 1014 are rotatably mounted on the table top and these drums, in conjunction with the input feed station 1004 constitute appropriate processing apparatus for selecting any desired card out of the group brought to the input station by the control of the rack member 1000.

The apparatus including the drums 1008, 1010, 1012 and 1014 may, as noted above, be similar to that described in the copending application 587,055 or 645,640. This apparatus includes suitable transducers 1016 and gate transfer mechanisms 1018, 1020, and 1022. In a manner described in detail in the copending cases, the number corresponding to a desired card from a selected subject matter classification is set up in a static register, and all the cards from the file corresponding to that classification are processed through the apparatus until the desired card is reached. At any time, of course, the group of cards from any subject matter classification may be removed from the rack 1000 and collated with other cards of the same subject matter classification by means of the collate-merge techniques described above.

The entire processing of the cards may be carried out automatically by the provision, for example, of suitable electrically driven conveyors for transporting the stacks of cards from the receiving station of one set of components of the apparatus of the invention to the feed station or stations of another set of components of the apparatus. These conveyors may be of any suitable form, and they may be electrically actuated so that when energized they will serve to bodily move a stack of cards from one of the stations to another. When such conveyors are used, a suitable control system, such as the circuitry of FIGURE 14 may be used.

The circuitry of FIGURE 14 includes a source of direct voltage 1001 which has a positive terminal, a negative terminal and a grounded common terminal. The positive terminal of the source 1001 is connected to one terminal of a switching mechanism 1003. The switching mechanism 1003 is associated with the feed station 18 of the apparatus of FIGURE 3, and the mechanism is adapted to close when the last card leaves the feed station. The switching mechanism includes a pair of fixed contacts insulated from one another and mounted on the feed head of the feed station 18. A short-circuiting armature is carried by a pusher member in the feed station, and this armature closes with the contacts when the last card leaves the station.

The other contact of the switching mechanism 1003 is connected to a capacitor 1005, and the capacitor connects with a differentiator 1007. The differentiator is, in turn, connected to a delay line 1009, and the delay line is connected to the armature of the switch 246a. The switch 246a is mechanically coupled to the switch 246 in FIGURE 6. The armature of the switch 246a engages its upper fixed contact (as illustrated in FIGURE 14) when the switch 246 is in the closed position (as illusrated in FIGURE 6). When the switch 246 of FIGURE 6 is opened, however, the armature of the switch 246a in FIGURE 14 engages the lower fixed contact of the switch, rather than the upper fixed contact.

The upper fixed contact of the switch 246a is connected to the left input terminal of a flip-flop 1011 and to the input terminal of a delay line 1013. The output terminal of the delay line is connected to the right input terminal of the flip-flop 1011. The left output terminal of the flip-flop 1011 is connected to the control grid of a triode 1015. The control grid of the triode is connected to a register 1017 which, in turn, connects with the negative terminal of the source 1001. The cathode of the triode 1015 is grounded, and its anode is connected to one terminal of an energizing winding 1019. The other terminal of the energizing winding 1019 is connected to the positive terminal of the source 1001.

The energizing winding 1019 is associated with a suitable conveyor, which is capable of moving the cards from the stacking station 20 of the apparatus of FIGURE 3 and the placing them in the feed station 320 of the apparatus of FIGURE 7. Whenever the triode 1015 is rendered conductive, the energizing winding 1019 is energized to actuate the conveyor and cause it to remove cards from the stack station 20 of FIGURE 3 to the feeding station 320 of FIGURE 7.

The lower fixed contact of the switch 246a is connected to the right input terminal of a flip-flop 1021, to the input terminal of a delay line 1023 and to the input terminal of a delay line 1024. The output terminal of the delay line 1023 is connected to the right input terminal of the flip-flop 1021. The left output terminal of the flip-flop 1021 is connected to the control grid of a triode 1026. The cathode of the triode 1026 is grounded, and a resistor 1028 is interposed between its control grid and the negative terminal of the source 1000. An energizing winding 1030 has one terminal connected to the anode of the triode 1026, and the other terminal of this winding is connected to the positive terminal of the source 1001. Whenever the winding 1030 is energized, a conveyor similar to the one mentioned above is activated to transfer cards from the stacking station 20 of FIGURE 3 to the feeding station 332 of FIGURE 7.

The delay line 1024 connects with the control grid of a triode 1032 and with a resistor 1034, the resistor being connected to the negative terminal of the source 1001. The cathode of the triode is grounded, and its anode is connected to a relay energizing winding 1036 which, in turn, connects with the positive terminal of the source 1001. The relay controlled by the energizing winding 1036 has a pair of normally open contacts disposed in shunt with the starting switch 508 of the control circuitry of FIGURE 8. Therefore, when the winding 1036 is energized by the conduction of the triode 1032, the control circuitry of FIGURE 8 is placed in operation.

The feeding station 320 of FIGURE 7, and the feeding station 332 of FIGURE 7, have respective switching mechanisms 1038 and 1040 which are similar to the mechanism 1002 described above. The switching mechanism 1038 has one terminal connected to the positive terminal of the source 1001 and the other terminal of this switching mechanism is connected to the first terminal of the switching mechanism 1040. The other terminal of the switching mechanism 1040 is connected to a capacitor 1042 which, in turn, is connected to a differentiator 1044. The differentiator 1044 is connected to a delay line 1046, and the delay line 1046 connects with the left input terminal of a flip-flop 1048, with the input terminal of a delay 1050 and with the input terminal of a delay line 1052. The output terminal of the delay line 1050 is connected to the right input terminal of the flip-flop 1048.

The left output terminal of the flip-flop 1048 is connected to the control grid of a triode 1054. A resistor 1056 is connected to that control grid and to the negative terminal of the source 1001. The cathode of the triode 1054 is grounded, and its anode is connected to an energizing winding 1058, the other terminal of the energizing winding being connected to the positive terminal of the source 1001. The energizing winding 1058 activates a conveyor, similar to the conveyors mentioned above, and which serves to move the cards from the receiving station 344 of FIGURE 7 and removing them to the feed station associated with the equipment of FIGURE 9 and which is similar to the feed station 18 described in conjunction with the apparatus of FIGURES 2 and 3.

The delay line 1052 is connected to the control grid of a triode 1060, the cathode of the triode being grounded. A resistor 1062 is connected to the control grid of the triode 1060 and to the negative terminal of the source 1000. A relay energizing winding 1064 is interposed between the anode of the triode 1060 and the positive terminal of the source 1001. The relay actuated by the winding 1064 has a pair of normally open contacts in shunt with the starting switch 662 of the control circuitry of FIGURE 10. Therefore, when the triode 1060 is rendered conductive, the control circuitry of FIGURE 10 is placed in operation.

The apparatus of FIGURE 9 has a feed station, as mentioned above, which is similar to the feed station 18 described in conjunction with the apparatus of FIGURES 2 and 3. This feed station has a switch mechanism 1066 associated with it, and when the last card is out of the feed station, this switch mechanism closes. The switch mechanism 1066 has a first terminal connected to the positive terminal of the source 1001, and the other terminal of the switch mechanism is connected to a capacitor 1068. The capacitor 1068 connects with a differentiator 1070 which, in turn, is connected to a delay line 1072. The delay line 1072 is connected to the left input terminal of a flip-flop 1074, to the input terminal of a delay line 1076, and to the input terminal of a delay line 1078. The output terminal of the delay line 1076 is connected to the right input terminal of the flip-flop 1074. The left output terminal of the flip-flop 1074 is connected to the control grid of a triode 1080. A resistor 1082 is connected to the control grid of the triode 1080 and to the negative terminal of the source 1001. An energizing winding 1084 is connected to the anode of the triode 1080 and to the positive terminal of the source 1001. The winding 1084 is associated with a conveyor, similar to the conveyors described above, and this conveyor serves to move the cards from the stack station associated with the equipment of FIGURE 9 to the feed station 804 of the equipment of FIGURE 11.

The delay line 1078 connects with the control grid of a triode 1086, this control grid being connected to a resistor 1088. The resistor 1088 connects with the negative terminal of the source 1001. The anode of the triode 1086 is connected to a relay energizing winding 1090, and this latter winding is connected to the positive terminal of the source 1001. The relay associated with the winding 1090 has a pair of normally open contacts connected across the starting switch 996 in the control circuitry of FIGURE 12. Therefore, when the triode 1086 is rendered conductive to energize the winding 1090, the control circuitry of FIGURE 12 is placed in operation.

It will be remembered that master cards are first placed in the station 18 of the apparatus of FIGURE 3 and circulated so that appropriate photographic information may be recorded on each master card. When such recording has been accomplished, the master cards are stacked in the station 20, as described above. During this first operation, the switch 246a of FIGURE 14 engages its upper fixed contact, as illustrated. When the last master card leaves the feed station 18, the switch 1003 closes and the capacitor 1005 develops an output pulse. This pulse is differentiated by the differentiator 1007 to produce a sharp output pulse. The sharp output pulse from the differentiator is delayed an appropriate time to permit the last card out of the station 18 to be processed and to be deposited in the receiving station 20. This delay is provided by the delay line 1009.

After the appropriate delay, the flip-flop 1011 is triggered to a true state to render the triode 1015 conductive. This energizes the winding 1019 to activate the conveyor and cause the master cards to be moved from the receiving station 20 of the apparatus of FIGURE 3 and placed in the feeding station 320 of the apparatus of FIGURE 7. After a time interval sufficient to enable the above operation to be carried out, the delay line 1013 produces an output pulse which returns the flip-flop 1011 to a false state and deactivates the conveyor. The master cards are now in the station 320 of the apparatus of FIGURE 7, which is the desired placement for these cards.

Then, in accordance with the concepts of the invention, the index cards are placed in the input station 20 and the switch 246 of FIGURE 6 is moved to an open position. This causes the switch 236a of FIGURE 14 to engage its lower fixed contact. Now, when the last index card is fed out of the station 18, the switch mechanism 1003 again closes, and again the delay line 1009 generates a suitably delayed pulse. This latter pulse is introduced to the left input terminal of the flip-flop 1021 to trigger that flip-flop to a true state. This renders the triode 1026 conductive to energize the winding 1030 and activate the conveyor which moves the index cards from the station 20 of the apparatus of FIGURE 3 to the feeding station 332 of the apparatus of FIGURE 7.

At this time, the master cards and index cards are both in their appropriate positions in the apparatus of FIGURE 7, so that they are ready to be merged by that apparatus in the described manner. The delay line 1024 now produces an output pulse to render the triode 1032 momentarily conductive. This causes the relay contacts associated with the winding 1036 to close momentarily so as to start the control circuitry of FIGURE 8 and initiate the above-described merging process in the apparatus of FIGURE 7.

When the last card leaves the station 320 of FIGURE 7, and when the last card leaves the station 332 of FIGURE 7, both the switching mechanisms 1038 and 1040 close. This causes the capacitor 1042 to pass a pulse on to the differentiator 1044. The differentiator generates a sharp output pulse which is delayed by the delay line 1046. The delay in the delay line 1046 is sufficient to enable the last merged card to be fed into the station 344 of the apparatus of FIGURE 7. Then the flip-flop 1048 is triggered to a true state to render the triode 1054 conductive. This causes the winding 1058 to be energized so that the conveyor associated with that winding moves the cards from the station 344 of FIGURE 7 to the feed station corresponding to the feed station 18 of FIGURE 2 and associated with the apparatus of FIGURE 9, as described above. Then, and after all the cards have been moved to the latter feed station, the delay line 1054 returns the flip-flop 1048 to its original false state, and the delay line 1052 renders the triode 1060 momentarily conductive. The conductivity of the triode 1060 energizes the relay winding 1064 so that the control circuitry of FIGURE 10 is set in operation. This causes the master and index cards to be processed by the apparatus of FIGURE 9 in the manner described above.

When the last card leaves the feed station associated with the apparatus of FIGURE 9, the switch mechanism 1066 closes. This causes the capacitor 1068 to introduce a pulse to the differentiator 1070, and it causes the differentiator to introduce a sharp output pulse to the delay line 1072. The latter pulse is delayed by the delay line 1072 for a time sufficient to permit the last card to be processed in the apparatus of FIGURE 9 and to be deposited in the receiving station. Then the flip-flop 1074 is triggered to activate the conveyor winding 1084. This causes the associated conveyor to move the cards from the stacking station of the apparatus of FIGURE 9 to the feed station 804 of the apparatus of FIGURE 11. When all the cards are in the feed station, the delay line 1076 returns the flip-flop 1074 to its false state, and the delay line 1078 causes the relay winding 1090 to be energized. This sets the control apparatus of FIGURE 12 into operation, so that the sorting operation described above may be carried out by the apparatus of FIGURE 11. Therefore, in the abovedescribed manner, the cards may be automatically moved from one group of components of the apparatus of the invention to another until all the steps contemplated by the invention have been carried out.

The invention provides, therefore, an improved method and system whereby documentary pages may be photographically recorded on information storage cards, with the images being identified by digital data which is also recorded on the cards. In the system of the invention, the information storage cards bearing any particular desired document may be quickly brought to an access point for study. The system is also most flexible in the introduction of new index and master cards into the equipment. Also, the invention provides apparatus with novel and improved features which permit the transfer of photographic images onto master cards, and from master cards to different index cards, to be efficiently and expeditiously carried out.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:
1. A method of providing information storage cards having photographic images formed thereon and further having data identifying such images recorded thereon, which method includes the steps of forming photographic images corresponding to different documents on a film strip, recording different digital data at a selected position on each of a plurality of master cards to identify the individual master cards with respect to the different document images on the film strip, causing different photographic images from the film strip to be exposed on different ones of the master cards in accordance with the digital data on such master cards so that the images on the film strip of a particular document are exposed on a master card bearing digital data identifying that document, providing a plurality of information storage index cards bearing digital data at a selected position on each such card corresponding to the document-identifying digital data on respective ones of the master cards, collating the master cards and the index cards with respect to the document-identifying digital data thereon into a stack with each master card being grouped with all the index cards bearing corresponding document-identifying digital data, introducing each master card and an index card bearing corresponding document-identifying data into a photographic reproduction system, and shining light through the photographic image on each of the master cards and onto the index card bearing corresponding document-identifying data to cause photographic images on each of the master cards to be exposed on each of the index cards bearing corresponding document-identifying digital data.

2. A method of providing information storage cards having photographic images formed thereon and further having data identifying such images recorded thereon, which method includes the steps of forming photographic images corresponding to different documents on a film strip, recording different digital data at a selected position on each of a plurality of master cards to indentify the individual master cards with respect to the different document images on the film strip, causing different photographic images from the film strip to be exposed on different ones of the master cards in accordance with the digital data on such master cards so that the image of a particular document on the film strip is exposed on a master card bearing digital data identifying that document, sorting the master cards into a logical progression with respect to the digital data at the selected position, providing a plurality of information storage index cards bearing digital data at a selected position on each card corresponding to the document-identifying digital data on respective ones of the master cards, sorting the index cards into the same logical progressions as the master cards with respect to the digital data at the selected position, collating the master cards and the index cards with respect to the digital data at the selected position thereon into a stack with each master card being grouped with all the index cards bearing the same document-identifying digital data, superimposing each master card and an index card bearing corresponding document-identifying data in a photographic reproduction system, and shining light through the photographic image on each of the master cards and onto the index card bearing corresponding document-identifying data to cause photographic images on each of the master cards to be exposed on each of the index cards having corresponding document-identifying digital data.

3. The method set forth in claim 1 including the additional steps of separating the master cards from the index cards after the photographic images on the master cards have been exposed on the index cards.

References Cited by the Examiner
UNITED STATES PATENTS

| | | |
|---|---|---|
| 2,295,000 | 9/1942 | Morse. |
| 2,511,859 | 6/1950 | Langan 235—61.12 |
| 2,820,907 | 1/1958 | Silverman. |
| 2,903,941 | 9/1959 | Bornemann 88—24 |
| 2,914,746 | 11/1959 | James. |
| 2,986,967 | 6/1961 | Albert et al. |
| 3,022,716 | 2/1962 | Smith et al. 95—77.5 |
| 3,051,069 | 8/1962 | Neale 95—73 |
| 3,093,050 | 6/1963 | Smith 95—73 |

JULIA E. COINER, *Primary Examiner.*

EVON C. BLUNK, *Examiner.*